United States Patent [19]
Fujikawa et al.

[11] Patent Number: 5,495,464
[45] Date of Patent: Feb. 27, 1996

[54] OPTICAL DATA RECORDING/REPRODUCING APPARATUS

[75] Inventors: Kazuhiro Fujikawa, Tokyo; Nobuo Miyairi, Kanagawa; Yasuhiro Miyazaki, Tokyo; Takashi Ogata, Tokyo; Masaaki Komiya, Tokyo, all of Japan

[73] Assignee: Olympus Optical Co., Ltd., Tokyo, Japan

[21] Appl. No.: 296,753

[22] Filed: Aug. 26, 1994

[30] Foreign Application Priority Data

Oct. 20, 1993 [JP] Japan .................... 5-262540
Apr. 27, 1994 [JP] Japan .................... 6-090009

[51] Int. Cl.⁶ .................................... G11B 7/00
[52] U.S. Cl. ................ 369/121; 369/90; 369/116
[58] Field of Search .................. 369/116, 32, 90, 369/121, 44.25, 44.29, 122, 107; 360/77.02, 78.06, 78.07, 33.1

[56] References Cited

U.S. PATENT DOCUMENTS

| | | | |
|---|---|---|---|
| 4,107,478 | 8/1978 | Takahashi et al. | 369/90 |
| 5,307,337 | 4/1994 | Woloszczuk | 369/121 |
| 5,335,213 | 8/1994 | Fukomoto et al. | 369/121 |
| 5,363,365 | 11/1994 | Ajima | 369/121 |

FOREIGN PATENT DOCUMENTS

| | | |
|---|---|---|
| 59-9086 | 2/1984 | Japan . |
| 62-119743 | 6/1987 | Japan . |
| 63-44782 | 2/1988 | Japan . |
| 63-90037 | 4/1988 | Japan . |
| 5-267761 | 10/1993 | Japan . |

*Primary Examiner*—Loha Ben
*Attorney, Agent, or Firm*—Frishauf, Holtz, Goodman, Langer & Chick

[57] ABSTRACT

In an optical data recording/reproducing apparatus for performing write and read operations of data by irradiating laser light onto an optical data recording medium, in order to reduce noise of a semiconductor laser, an HF oscillator is provided to superpose an HF current on a drive current to be applied to the semiconductor laser. The HF oscillator is housed in a conductive shield case together with the semiconductor laser. An LC low-pass filter is also provided in a signal line connecting the components inside and outside the shield case to prevent undesired radiation of the HF current. A write drive line and a read drive line of the semiconductor laser are separated in the shield case, and the write drive line is disconnected from the HF oscillator in at least a read mode.

17 Claims, 17 Drawing Sheets

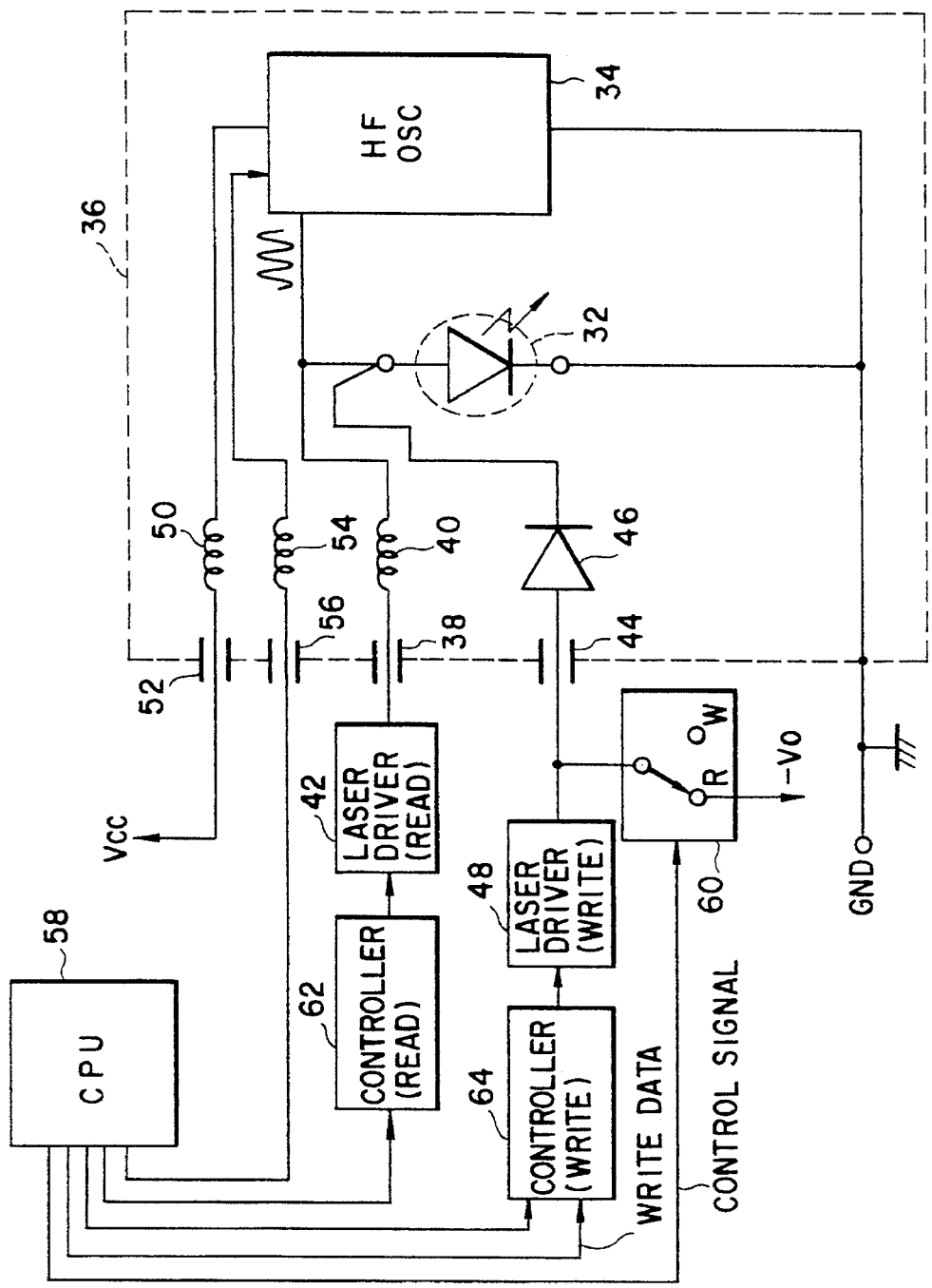
F I G. 5

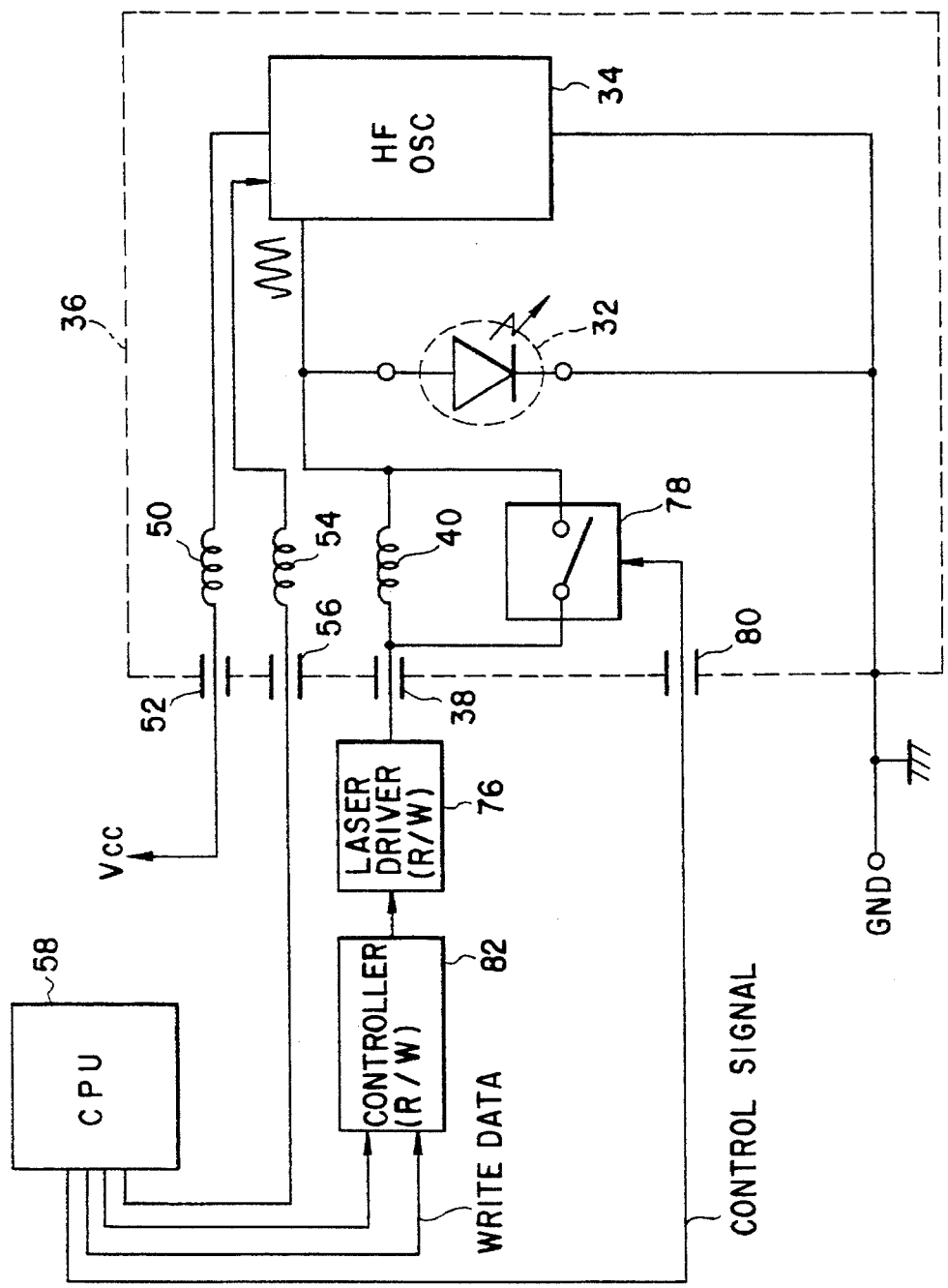
F I G. 9

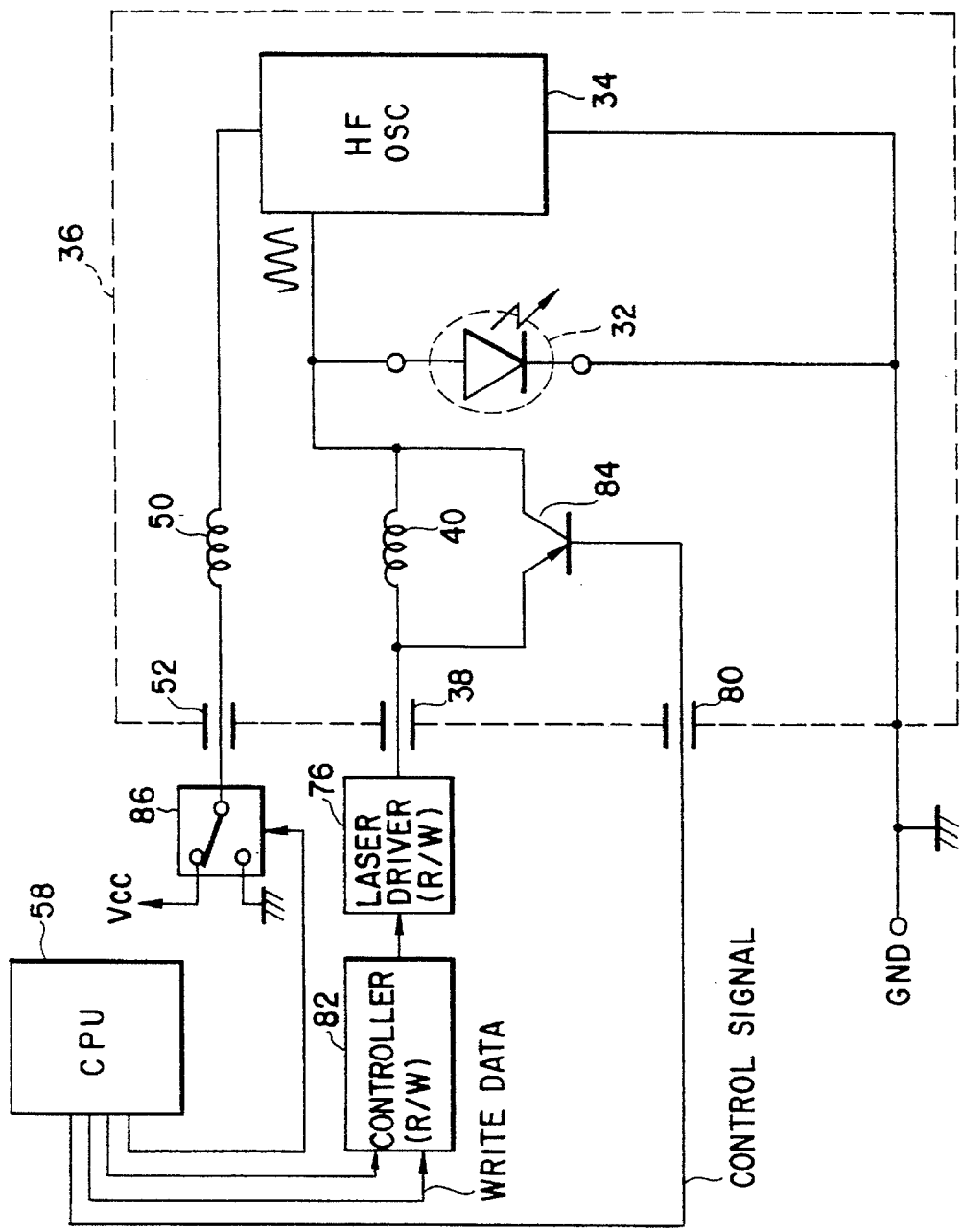
F I G. 11

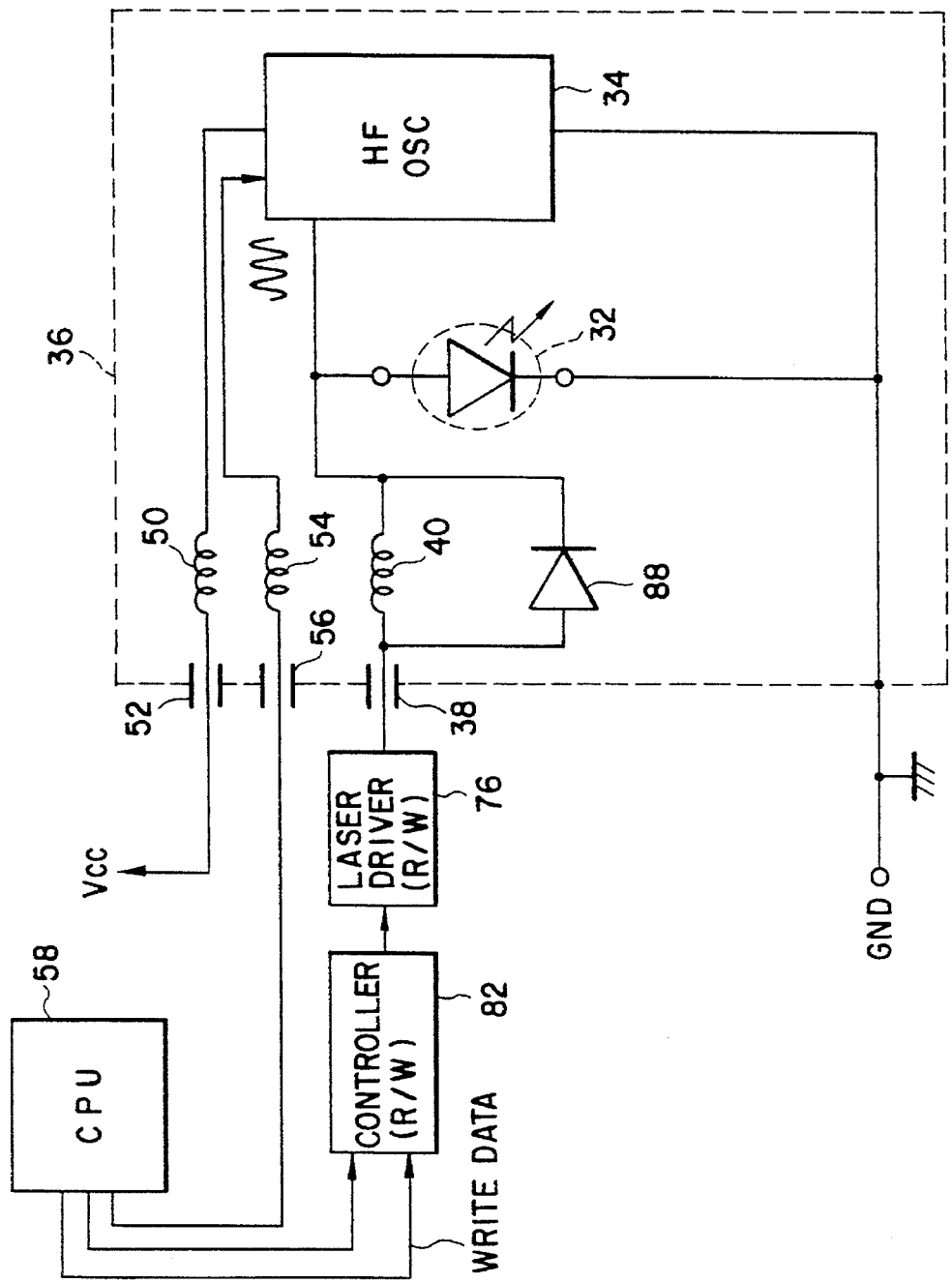
F I G. 12

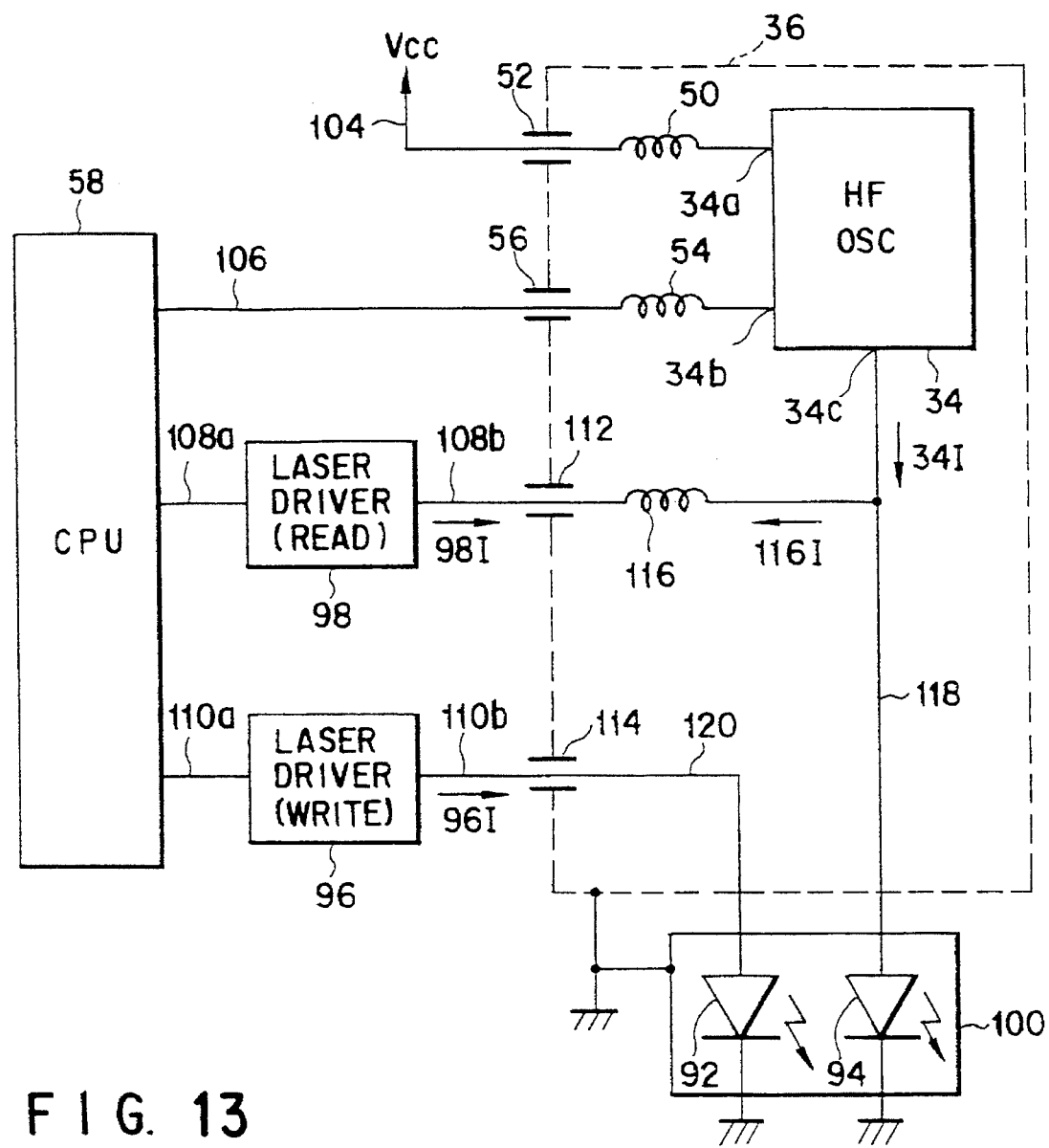
F I G. 13

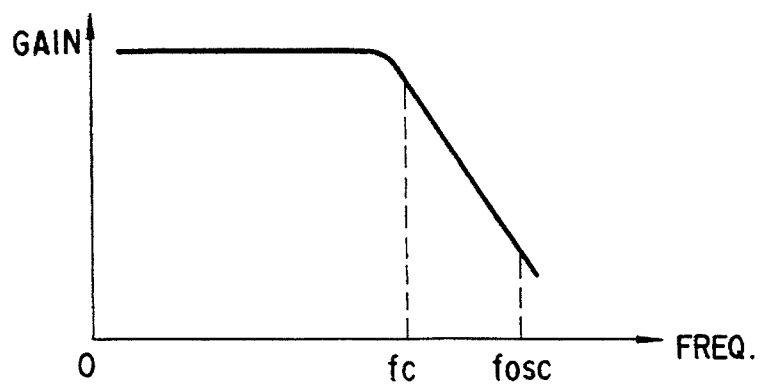
F I G. 14
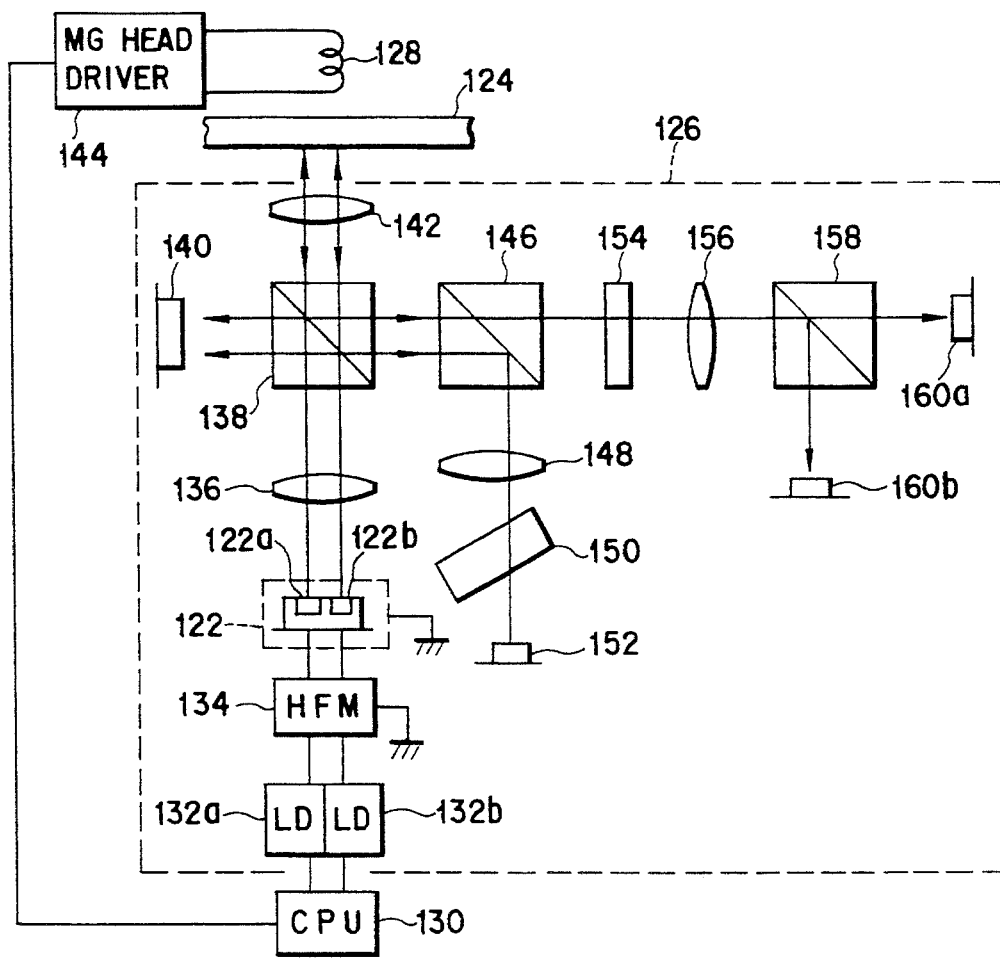
F I G. 15

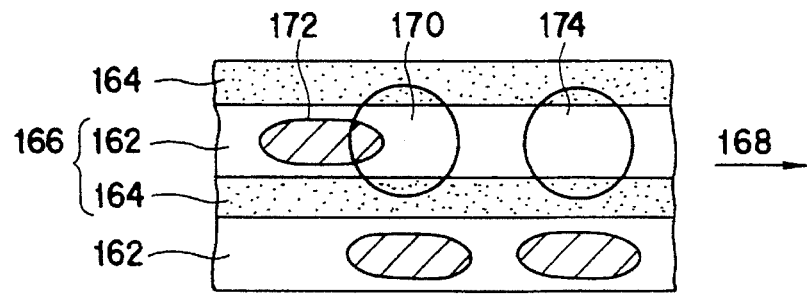
F I G. 16
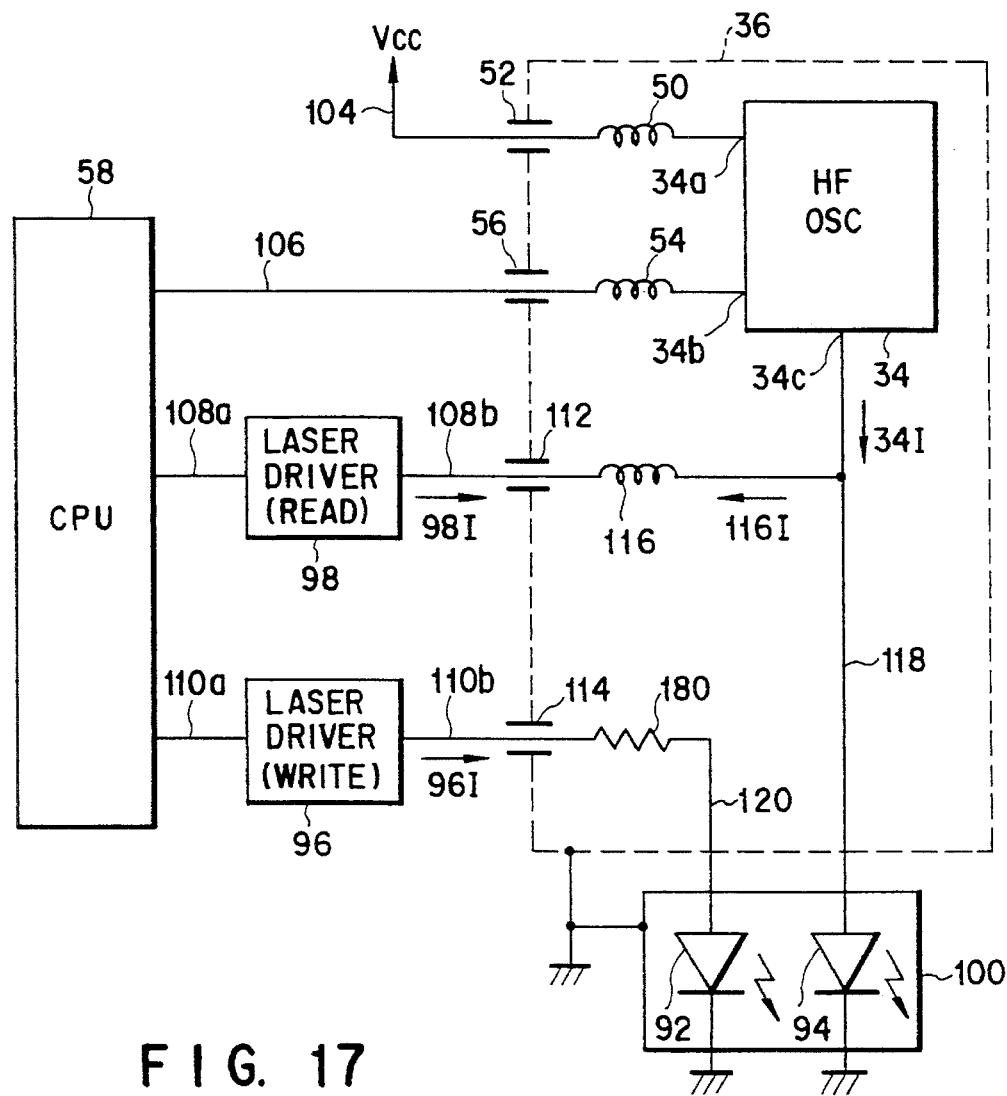
F I G. 17

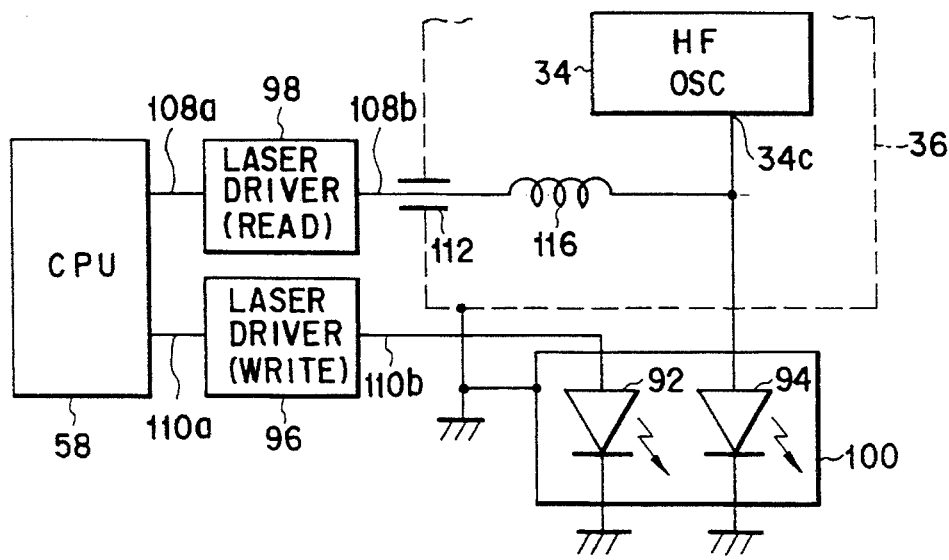
F I G. 18
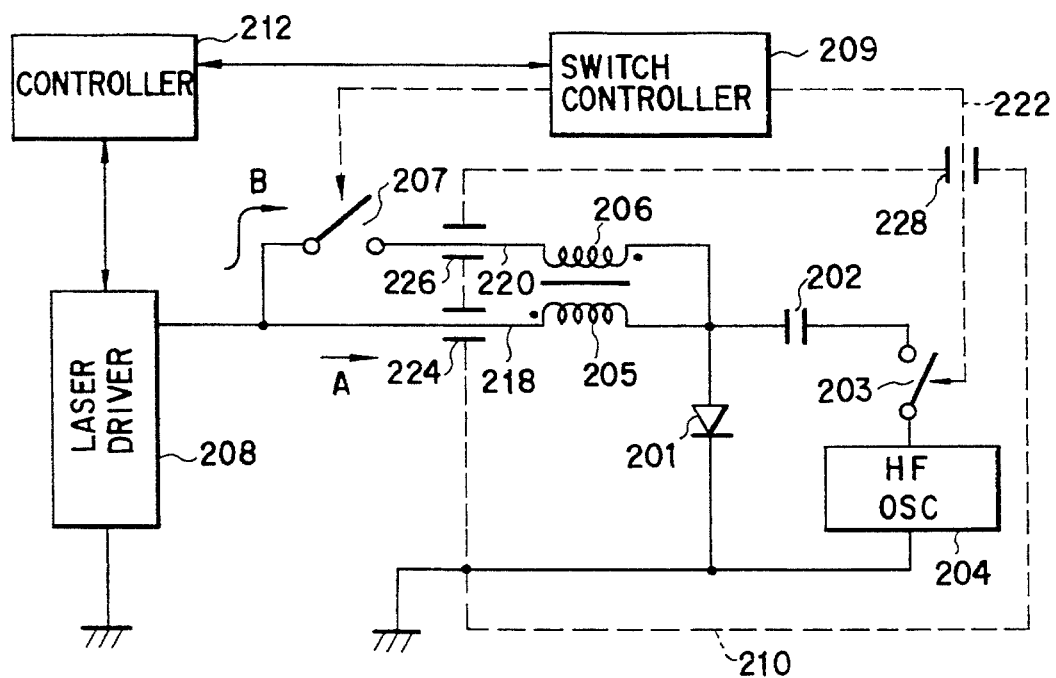
F I G. 19

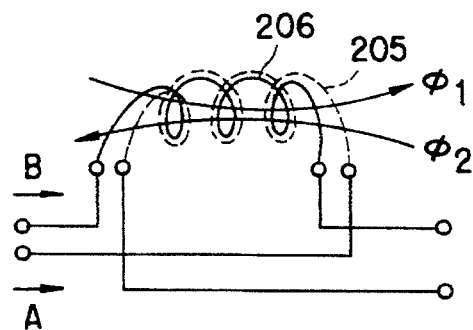
F I G. 20A
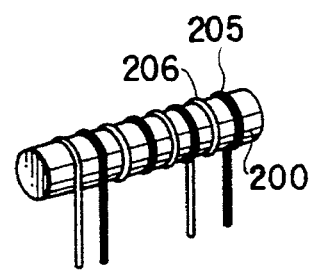
F I G. 20B
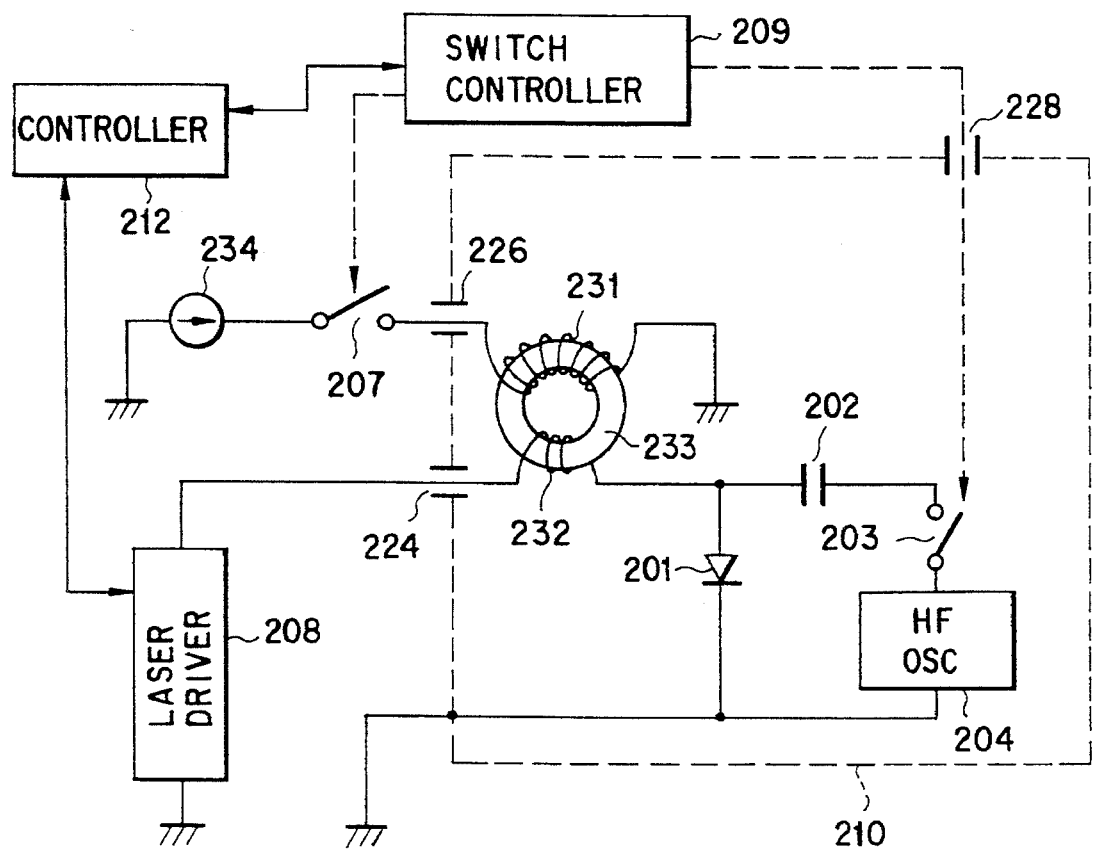
F I G. 21

OPTICAL DATA RECORDING/REPRODUCING APPARATUS

BACKGROUND OF THE INVENTION

1. Field of the Invention

The present invention relates to an optical data recording/reproducing apparatus for optically or magneto-optically writing/reading data by using a semiconductor laser and, more particularly, to a data recording/reproducing apparatus including a high-frequency (HF) oscillator circuit for reducing noise of the semiconductor laser.

2. Description of the Related Art

Conventional optical data recording/reproducing apparatuses make use of an HF oscillator circuit for reducing noise of a semiconductor laser. An example of a laser driver circuit having the HF oscillator circuit is described in Japanese Patent Publication (KOKOKU) No. 59-9086. In this conventional example, noise is reduced by superposing an HF current on a direct current to be applied to a semiconductor laser in a read (reproducing) mode or an erase mode. In such an optical data recording/reproducing apparatus, a semiconductor laser and an HF oscillator circuit must be located closely in order to flow the HF current only into the laser and to prevent the HF current from being leaked to a portion other than the laser.

Japanese Patent Disclosure (KOKAI) No. 63-44782 discloses a semiconductor laser driving apparatus in which an HF oscillator circuit and a negative feedback circuit are arranged in a single package. This apparatus includes a circuit for preventing undesired or unwanted radiation of electromagnetic waves brought about by superposition of an HF current.

Japanese Patent Disclosure (KOKAI) Nos. 62-119743 and 63-90037 disclose an apparatus in which an HF oscillator circuit is operated to reduce noise of a semiconductor laser in a read mode, and, while the semiconductor laser is oscillating with a high output, as in a write (recording) or erase mode, the operation of the HF oscillator circuit is stopped because the influence of noise is insignificant. This arrangement makes it possible to prevent the laser from exceeding the rated output when an HF oscillation signal is superposed on a drive current, solving the problem of a short life of the semiconductor laser caused by the HF superposition.

On the other hand, radio interference is of a problem in a laser driver circuit having an HF oscillator circuit. Therefore, an HF oscillator circuit is shielded by grounding by surrounding it with a conductive package. Alternatively, in extracting an electrode from a package, such as a control signal electrode, power supply electrode, or a laser driving signal electrode, an undesired radiation preventing circuit is constituted by using, e.g., a feedthrough type capacitor and a coil. In Japanese Patent Disclosure (KOKAI) No. 63-44782, interferences caused by a leak of HF radio waves to the outside are prevented by an undesired radiation preventing circuit constituted by an LC filter consisting of a coil and a feedthrough capacitor added to a driving system of a semiconductor laser. Radio interference is prevented by this undesired radiation preventing circuit or by the shield.

Recently, demands have increasingly arisen for a high density, a high speed, and a higher transfer rate of optical data recording/reproducing apparatuses. For this reason, in an apparatus of optical modulation type in which data are written by modulating the output from a semiconductor laser, it becomes necessary to raise the modulation speed and the rising speed of the semiconductor laser output.

This undesired radiation preventing circuit, however, cuts off HF components and therefore has the following inconvenience. That is, the function of the undesired radiation preventing circuit sometimes makes it impossible to obtain a high modulation speed and a high rising speed of the semiconductor laser output during the write operation.

The apparatuses disclosed in Japanese Patent Disclosure (KOKAI) Nos. 62-119743 and 63-90037 have no problem of undesired radiation in the write and erase modes, since the HF oscillator circuit is turned off during write and erase modes. Unfortunately, a conventional write driving system of a semiconductor laser drives the semiconductor laser via an undesired radiation preventing circuit. Therefore, even an undesired radiation preventing circuit which effectively functions to prevent radiation brought about by superposition of an HF current during a read mode becomes an obstacle to a modulated write drive signal supplied by a write driving system. That is, the problem of cutting off HF components during a write mode has not been solved yet.

On the other hand, in situations where an oscillation frequency $f_{osc}$ of an HF oscillator circuit is close to a frequency band $f_w$ in which a semiconductor laser is driven, if a line on which an HF current is superposed is connected to a drive line for driving the semiconductor laser as in the apparatus described in Japanese Patent Disclosure (KOKAI) No. 63-90037, it is difficult to accomplish both an improvement in the transmission efficiency which is realized by improving the recording/reproducing rate by increasing the disk rotating speed, and a function of attenuating HF oscillation waves leaking from the HF oscillator circuit.

Additionally, in an apparatus which also performs a write operation, verification for checking whether data is written correctly is essential. Therefore, it is desirable that a write operation including this verification operation be completed within short time periods.

A laser driver circuit is also used in a magnetooptical recording/reproducing apparatus. In these apparatuses, as in the optical recording/reproducing apparatuses discussed above, an HF superposition scheme by which noise of a semiconductor laser is reduced in the read mode is generally used in order to ensure a high reliability by improving the signal quality.

In this HF superposition scheme, a semiconductor laser is driven by superposing an HF current of a few hundred MHz on a bias current of the semiconductor laser such that this HF current is below the threshold current, thereby making the semiconductor laser oscillate in a multi-lateral mode. This consequently reduces the coherence of the semiconductor laser, improving the system rigidity against returning light, i.e., disturbance. That is, the emitted light output when the semiconductor laser is driven with a direct current as in the read mode finely varies with disk displacement, i.e., finely varies for every disk displacement of $\lambda/2$ ($\lambda$ is the laser oscillation wavelength). This fine variation results from an alternate change of the semiconductor laser oscillation between a single-longitudinal mode, in which the light output is high, and a multi-longitudinal mode, in which the light output is low, which is attributed to changes in an external resonance mode formed between the emission surface of the semiconductor laser and an optical disk. When a high frequency is superposed, therefore, the semiconductor laser oscillates constantly in the multi-longitudinal mode to thereby suppress the fine variations.

A conventional example of a laser driver circuit using this HF superposition scheme is an apparatus in which a semiconductor laser and an HF superposition circuit are arranged adjacent to each other and placed in a shield case integrally with a laser driver circuit for driving the semiconductor laser during write and read modes.

Since, however, the laser driver circuit is provided integrally with the other components in the shield case and since the loss of the driver circuit becomes as large as about 1 W, the resulting heat raises the temperatures of the semiconductor laser and the HF oscillator circuit arranged in the shield case. The result is an unstable operation or a short life of the laser. To avoid this problem, a heat-radiating fin can be provided in the shield case. However, to effectively perform heat radiation by using the heat-radiating fin, the size of the shield case must be increased.

To solve this problem, there is a conventional apparatus in which a laser driver circuit is arranged outside a shield case.

FIG. 1 shows the outline of a conventional example which has effectuated this arrangement. A semiconductor laser (laser diode) 2 and an HF superposition circuit 4 are arranged close to and integrally with each other in a shield case 6. A laser driver circuit 8 for driving the semiconductor laser 2 for writing and reading operations, and an HF oscillation control circuit 10 for controlling the HF superposition circuit 4 are arranged outside the shield case 6. A drive line 8a of the driver circuit 8, a control line 10a extending from the HF oscillation control circuit 10 to perform on/off control of the HF superposition circuit 4, and a power line 4a for driving the HF superposition circuit 4 are connected to the individual circuits in the shield case 6 through feedthrough capacitors 12.

The HF superposition circuit 4 has an arrangement as shown in FIG. 2.

A series circuit consisting of a capacitor 14, a switch 16, and an HF oscillator circuit 18 is connected in parallel with the semiconductor laser 2. The cathode of the laser diode 2 is grounded, and its anode is connected to the driver circuit 8 via a coil 20.

The HF oscillator circuit 18 consists of a self-excited oscillator circuit constituted by transistors and the like (not shown). The HF oscillator circuit 18 superposes an HF current on the semiconductor laser 2 via the capacitor 14. That is, the HF oscillator circuit 18 superposes an HF current of a few hundred MHz on a drive current of the semiconductor laser 2 only in the read mode under the control of a switch 16 which is turned on/off by the HF oscillation control circuit 10 (to be described later). The laser driver circuit 8 drives the semiconductor laser 2 in the write and read modes; that is, the laser driver circuit 8 flows a current, which is modulated to have a changed amplitude in accordance with write data, to the semiconductor laser 2 in the write mode, and flows a constant current in the erase and read modes.

The HF oscillator circuit 18 is connected to a power supply vcc via a coil 22. The switch 16 is turned on/off by the HF oscillation control circuit 10. Note that the operation of the HF oscillator circuit 18 is controlled by on/off of the switch 16 in this example, but it is also possible to control the oscillation itself, e.g., to control the power supply of the HF oscillator circuit 18.

The semiconductor laser 2, the capacitor 14, the switch 16, and the HF oscillator circuit 18 are arranged inside the shield case 6, whereas the laser driver circuit 8 and the HF oscillation control circuit 10 are arranged outside the case 6. The feedthrough capacitors 12 are connected between a line 20a connecting the laser driver circuit 8 with the coil 20 and the shield case 6, between a line 22a connecting the coil 22 with the power supply Vcc and the shield case 6, and between a line 16a connecting the HF oscillation control circuit 10 with the switch 16 and the shield case 6.

The coils 20 and 22 and the feedthrough capacitors 12 constitute a low-pass filter for preventing a leak of HF noise from the HF oscillator circuit 18 to outside the shield case 6. The cutoff frequency of this low-pass filter is set at a value about one-tenth the frequency of the HF oscillator circuit 18 in order to prevent malfunctions occurring when electromagnetic induction noises jump to circuits or devices both inside and outside the magneto-optical recording/reproducing apparatus.

The HF oscillator circuit 10 is not limited to the above-mentioned form. As an example, Japanese Patent Disclosure (KOKAI) No. 5-267761 discloses an arrangement in which an HF oscillator circuit, an on/off control circuit for the HF oscillator circuit, and a laser driver circuit are placed in a single shield case.

Since the laser driver circuit 8 is arranged outside the shield case 6 in the above example, the problem of heat generated by the laser driver circuit 8 can be avoided. However, the semiconductor laser 2 is driven via the low-pass filter discussed above in the write and read modes. Therefore, when the recording density or the transfer rate of the magneto-optical recording apparatus is to be raised, the filter interferes with the raising of the speed of laser driving in the write mode.

That is, when the write frequency is raised to increase the write density or the transfer rate, the change rate in rise and fall of a current for driving the semiconductor laser 2 also increases to as high as, e.g., a few nanoseconds in some cases. A frequency band corresponding to this high rate is a few hundred MHz, which is close to the oscillation frequency of the HF oscillator circuit 4.

For this reason, when the low-pass filter is connected between the laser driver circuit 8 and the semiconductor laser 2, the drive current for the semiconductor laser 2 is influenced by the cutoff frequency of the low-pass filter. This sometimes decreases the amplitude or the rising speed. In particular, if the capacitance of the feedthrough capacitors 12 is about several ten pF, the inductance of the coil 20 connected in series with the semiconductor laser 2 to constitute the low-pass filter becomes around 100 nH. This decreases the rising or falling speed of the drive current for the semiconductor laser 2 or makes it difficult to perform high-speed driving of the semiconductor laser 2 by decreasing the amplitude. In addition, the power supply voltage of the laser driver circuit 8 must also be increased in performing high-speed driving including this low-pass filter. This introduces an additional problem of an increase in the consumption power of the driver circuit.

SUMMARY OF THE INVENTION

Accordingly, it is an object of the present invention to provide an optical data recording/reproducing apparatus capable of meeting requirements for a high density, a high speed, and a high transfer rate.

A related object of the present invention is to provide an optical data recording/reproducing apparatus capable of meeting requirements for a high density, a high speed, and a high transfer rate without degrading an undesired radiation preventing effect.

A further object of the present invention is to provide a magneto-optical data recording/reproducing apparatus capable of preventing a leak of HF-superposed signals to outside a shield case during a read operation without degrading a high-speed driving performance of a laser in a write mode.

According to the present invention, there is provided a data recording/reproducing apparatus comprising light source means for emitting write laser light and read laser light, a high frequency (HF) oscillating means, connected to the light source means, for supplying an HF signal for reducing laser noise to the light source means, a shield case for housing the light source means and the HF oscillating means, write driving means for supplying a write drive signal to the light source means through a write line, read driving means for supplying a read drive signal to the light source means through a read line provided independently of the write line in at least the shield case, and undesired radiation preventing means, connected to the read line, for preventing undesired radiation of the HF signal from the HF oscillating means.

According to the present invention, there is provided another data recording/reproducing apparatus comprising light source means for emitting write laser light and read laser light, high frequency (HF) oscillating means, connected to the light source means, for supplying an HF signal for reducing laser noise to the light source means, a shield case for housing the light source means and the HF oscillating means, write driving means for supplying a write drive signal to the light source means through a write line, read driving means for supplying a read drive signal to the light source means through a read line provided independently of the write line in at least the shield case, undesired radiation preventing means, connected to the read line, for preventing undesired radiation of the HF signal from the HF oscillating means, and control means for making a circuit constant of the undesired radiation preventing means in a write mode differ from a circuit constant in a read mode.

According to the present invention, there is provided a further data recording/reproducing apparatus comprising first light source means for emitting write laser light, second light source means for emitting read laser light, high frequency (HF) oscillating means, connected to the second light source means, for supplying an HF signal for reducing laser noise to the second light source means, a shield case for housing the second light source means and the HF oscillating means, and filter means, connected to a drive line of the second light source means in the shield case, for preventing transmission of the HF signal from the HF oscillating means to outside the shield case.

According to the present invention, there is provided a still another data recording/reproducing apparatus comprising light source means for outputting data write laser light with a variable intensity and data read laser light with a fixed intensity, high frequency (HF) oscillating means for superposing an HF signal on a drive signal for the light source means, a shield case for housing the HF oscillating means to prevent propagation of noise of the HF signal, driving means, arranged outside the shield case, for generating the drive signal for the light source means, HF cutoff filter means having a coil arranged inside the shield case on a signal line connecting the driving means and the light source means, and control means for controlling an inductance of the coil such that an inductance in a write mode is smaller than an inductance in a read mode.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a block diagram of a second embodiment of a laser driving apparatus according to the present invention;

FIG. 9 is a block diagram of a sixth embodiment of a laser driving apparatus according to the present invention;

FIG. 11 is a block diagram of a seventh embodiment of a laser driving apparatus according to the present invention;

FIG. 12 is a block diagram of an eighth embodiment of a laser driving apparatus according to the present invention;

FIG. 13 is a block diagram of a ninth embodiment of a laser driving apparatus according to the present invention;

FIG. 14 is a graph showing the characteristic of a filter circuit of the ninth embodiment;

FIG. 15 is a block diagram of a tenth embodiment of a laser driving apparatus according to the present invention;

FIG. 16 is a view showing the positional relationship between light spots formed on a disk in the tenth embodiment;

FIG. 17 is a block diagram of an eleventh embodiment of a laser driving apparatus according to the present invention;

FIG. 18 is a block diagram of a twelfth embodiment of a laser driving apparatus according to the present invention;

FIG. 19 is a block diagram of a thirteenth embodiment of a laser driving apparatus according to the present invention;

FIGS. 20A and 20B are views schematically showing a coil used in the thirteenth embodiment;

FIG. 21 is a block diagram of a fourteenth embodiment of a laser driving apparatus according to the present invention;

DETAILED DESCRIPTION OF THE PREFERRED EMBODIMENTS

A preferred embodiment of an optical data recording/reproducing apparatus according to the present invention will now be described with reference to the accompanying drawings.

Figure 4:
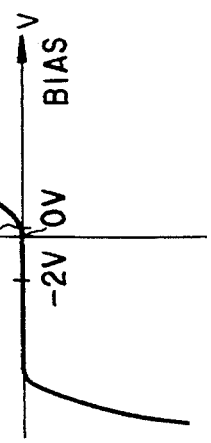
FIG. 4 is a graph showing the characteristic of a diode used in the first embodiment.
Figure 3:
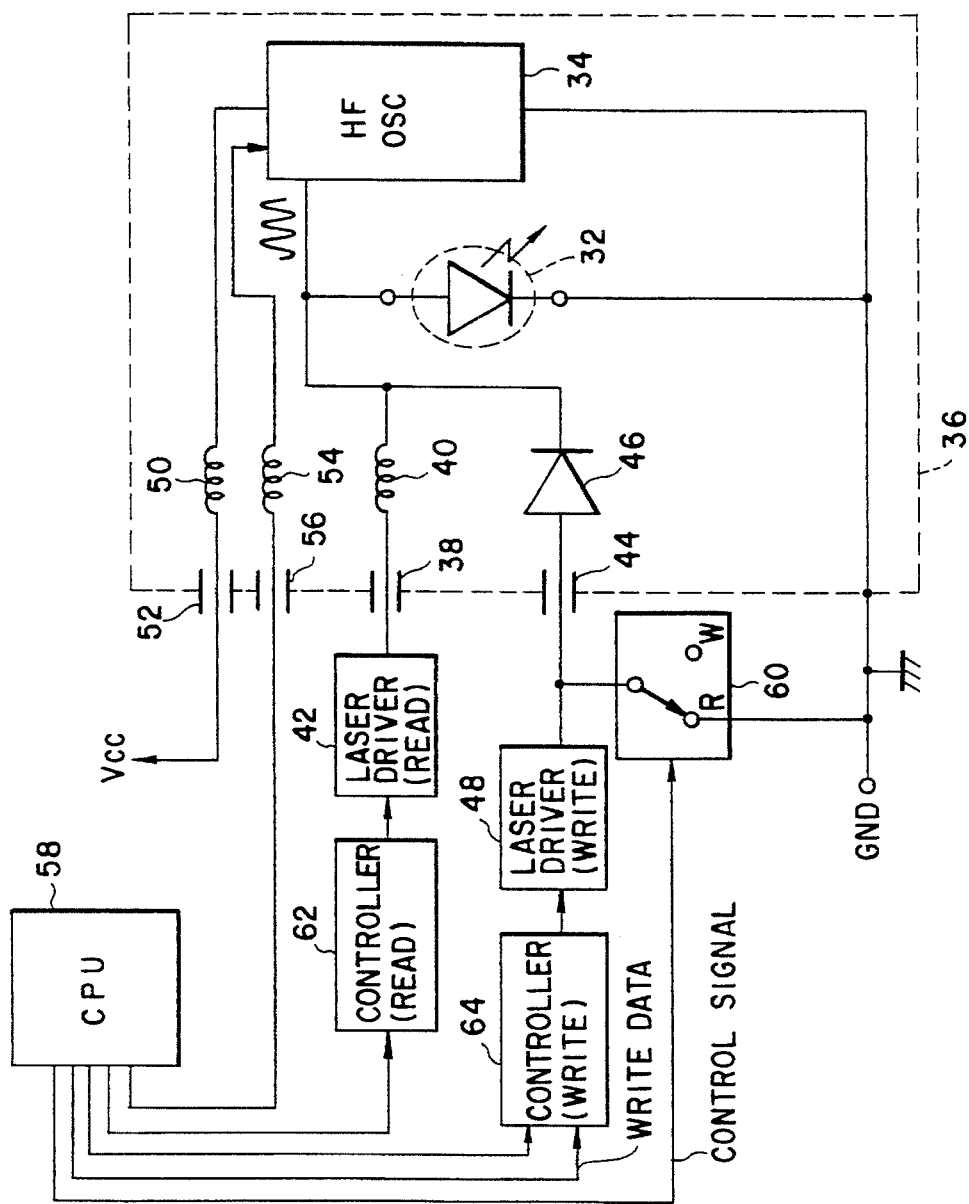
FIG. 3 is a block diagram of a first embodiment of a laser driving apparatus according to the present invention.

FIG. 3 is a block diagram of drivers and controllers of a semiconductor laser used in an optical data recording/reproducing apparatus according to the first embodiment of the present invention. FIG. 4 is a graph showing the characteristic of a diode used in this apparatus.

A semiconductor laser (laser diode) 32 is a light source of an optical head (not shown) and is driven in a write mode, a read mode, and an erase mode. This semiconductor laser 32 irradiates laser light for performing read, write, and erase of data onto an optical recording medium (not shown).

The semiconductor laser 32 is housed in a shield case 36 together with, e.g., a high-frequency (HF) superposing oscillator (to be abbreviated as an HF oscillator hereinafter) 34 and a low-pass filter (to be described later) which constitutes an undesired radiation preventing circuit. The HF oscillator 34 is driven in only the read mode to reduce semiconductor laser noise.

The semiconductor laser 32 is driven by a read laser driver 42 via a feedthrough capacitor 38 and a coil 40 which constitute the undesired radiation preventing circuit. A drive mode in this state is the read mode. Note that the read laser driver 42 is also driven in a verification mode.

The semiconductor laser 32 is driven by a write laser driver 48 via a feedthrough capacitor 44 and a switching diode 46. A drive mode in this state is the write mode. In the erase mode, the semiconductor laser 32 can be driven by either the read laser driver 42 or the write laser driver 48. In this embodiment, however, it is assumed that the semiconductor laser 32 is driven by the write laser driver 48 in the erase mode.

One end of the coil 40 and the cathode of the diode 46 are connected together to the anode of the laser diode 32. The cathode of the laser diode 32 is connected to the ground level (GND).

The HF oscillator 34 is connected to an oscillator power supply Vcc (e.g., +5 v) via a coil 50 and a feedthrough capacitor 52 which constitute the undesired radiation preventing circuit. The HF oscillator 34 superposes an HF current on a drive current of the semiconductor laser 32 via an internal coupling capacitor (not shown). The HF oscillator 34 is connected to a CPU 58 via a coil 54 and a feedthrough capacitor 56 which constitute the undesired radiation preventing circuit. Therefore, the on/off driving of the HF oscillator 34 is controlled by the CPU 58. Note that the on/off control of the HF oscillator 34 can also be performed by controlling power supply to the oscillator.

The feedthrough capacitors 38, 44, 52, and 56 extend through and are fixed to the shield case 36. An HF current is prevented from being radiated outside the case 36 by LC low-pass filters (the coils 40, 50, and 54 and the feedthrough capacitors 38, 52, and 56). With this HF superposition, the semiconductor laser 32 can oscillate at a stable, low noise level without being influenced by an optical system of the optical head.

A switch 60 is connected between the connecting point between the write laser driver 48 and the feedthrough capacitor 44 and the GND level. The common terminal of the switch 60 is connected to the connecting point between the write laser driver 48 and the feedthrough capacitor 44. The read terminal R of the switch 60 is connected to the GND, and the write terminal W is opened. The switching operation of the switch 60 is controlled by the CPU 58.

The read laser driver 42 and the write laser driver 48 are controlled by a read controller 62 and a write controller 64, respectively, which are controlled by the CPU 58. The write controller 64 receives and modulates write data.

An operation of the first embodiment with this arrangement will be described below. The switch 60 is switched by a control signal from the CPU 58 in accordance with an operating mode, turning on/off the diode 46.

In the read mode, the read laser driver 42 keeps the output from the semiconductor laser 32 constant. The HF oscillator 34 is driven only in the read mode by the CPU 58 to superpose an HF current on the drive current of the semiconductor laser 32, thereby reducing semiconductor laser noise. This makes a stable read operation feasible. The undesired radiation preventing circuit consisting of the LC low-pass filters (the coils 40, 50, and 54 and the feedthrough capacitors 38, 52, and 56) reduces undesired radiation.

At this time, the switch 60 is switched to the R terminal by the control signal from the CPU 58. The diode 46 has the characteristic shown in FIG. 4. Since the forward voltage of the semiconductor laser 32 is, e.g., about 2 V, the diode 46 is turned off when applied with a reverse voltage of, e.g., 2 V to the anode thereof. That is, since the write laser driver 48 is disconnected from the semiconductor laser 32 and the HF oscillator 34, it is possible to prevent undesired radiation from the system including the write laser driver 48.

In the write or erase mode, on the other hand, the write laser driver 48 controls the semiconductor laser 32, performing write or erase of data. In this case, write data of high frequencies which are required to increase the write speed of the apparatus can be processed because the undesired radiation preventing circuit is not interposed between the write laser driver 48 and the semiconductor laser 32 (or the cutoff frequency of a low-pass filter formed only by a capacitor) is set at a sufficiently high value. Stated another way, though the write and read laser driving systems are separately arranged, drive lines are provided in the shield case 36 and a common line is used for the drive lines at least after the coil 40 (on the semiconductor laser 32 side).

Since the HF oscillator 34 is OFF at that time, no undesired radiation is generated by the HF oscillator 34.

In the optical data recording/reproducing apparatus according to this embodiment as has been discussed above, the filters for preventing undesired radiation of the HF signal when the HF oscillator superposes the HF signal on the semiconductor laser in order to reduce noise of the laser brings about no inconvenience during the write operation. This allows the apparatus to meet demands for a high density, a high speed, and a high transfer rate.

In addition, this embodiment can stop the superposition of the HF signal in the write and erase modes. This prevents the laser from exceeding the rated output, resulting in a long life of the semiconductor laser.

Other embodiments of the present invention will be described below. In the following embodiments, the same reference numerals as in the first embodiment denote the corresponding parts, and a detailed description thereof will be omitted.

FIG. 5 is a block diagram showing a driving system and a control system of a semiconductor laser of an optical data recording/reproducing apparatus according to the second embodiment of the present invention. In the second embodiment, a voltage to be applied to a diode 46 is always negative (−Vo) in the read mode. This reliably disconnects the write laser driver 48 for write and erase from the semiconductor laser 32 and the HF oscillator 34. That is, the terminal R of the switch 60 is connected to a negative power supply (−Vo). In addition, though the cathode of the diode 46 and one end of the coil 40 are commonly connected to the anode of the semiconductor laser 32 in the first embodiment, the coil 40 and the anode of the semiconductor laser 32, and the cathode of the diode 46 and the anode of the semiconductor laser 32 are connected through different lines in the second embodiment. The rest of the arrangement, operation, and effect are identical with those of the first embodiment.

Figure 6:
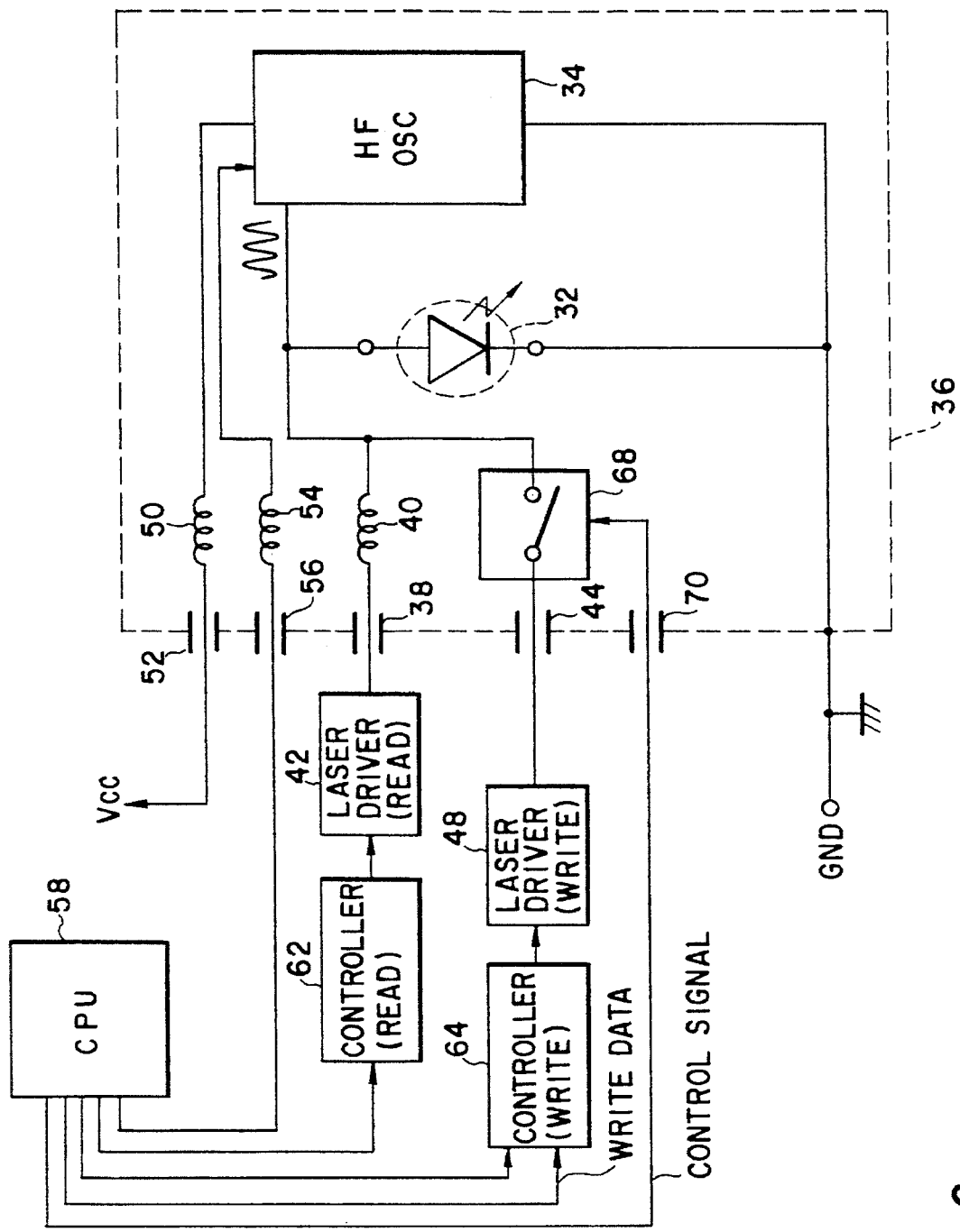
FIG. 6 is a block diagram of a third embodiment of a laser driving apparatus according to the present invention.

FIG. 6 is a block diagram showing a driving system and a control system of a semiconductor laser of an optical data recording/reproducing apparatus according to the third embodiment of the present invention.

In the third embodiment, the switch 60 which is used in the first embodiment is omitted, and a switch 68, instead of the diode 46, is used to disconnect the write laser driver 48 for write and erase from the semiconductor laser 32 and the HF oscillator 34. The switch 68 is, for example, a mechanical switch using an electromagnet. The opening/closing of the switch 68 is controlled by a control signal supplied from the CPU 58 via a feedthrough capacitor 70. The rest of the arrangement, operation, and effect are identical with those of the first embodiment.

Figure 7:
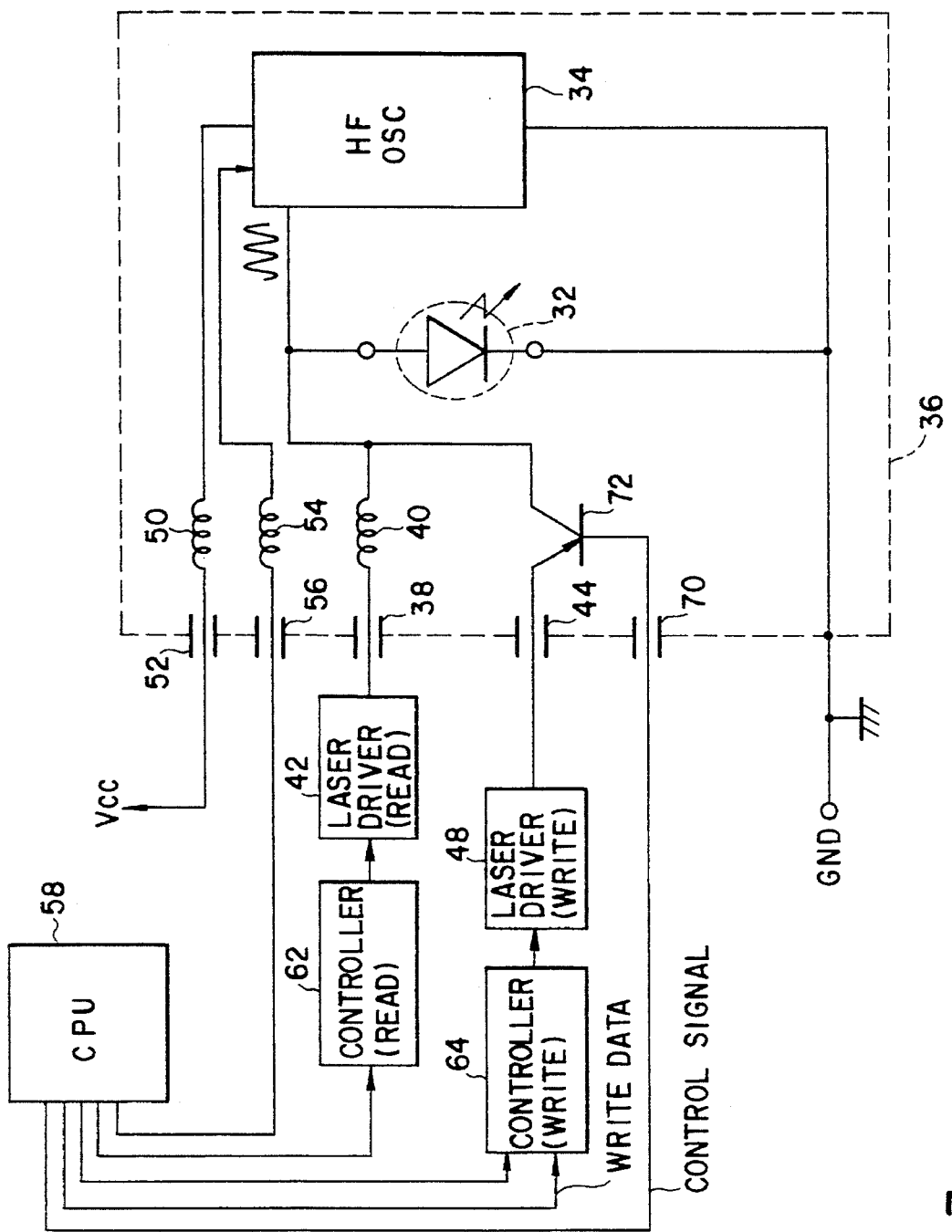
FIG. 7 is a block diagram of a fourth embodiment of a laser driving apparatus according to the present invention.

FIG. 7 is a block diagram showing a driving system and a control system of a semiconductor laser of an optical data recording/reproducing apparatus according to the fourth embodiment of the present invention. In the fourth embodiment, an electronic switching device, e.g., a transistor 72, instead of the mechanical switch 68 of the third embodiment, is used to disconnect the write laser driver 48 for write and erase from the semiconductor laser 32 and the HF oscillator 34. The rest of the arrangement, operation, and effect are identical with those of the first embodiment.

Figure 8:
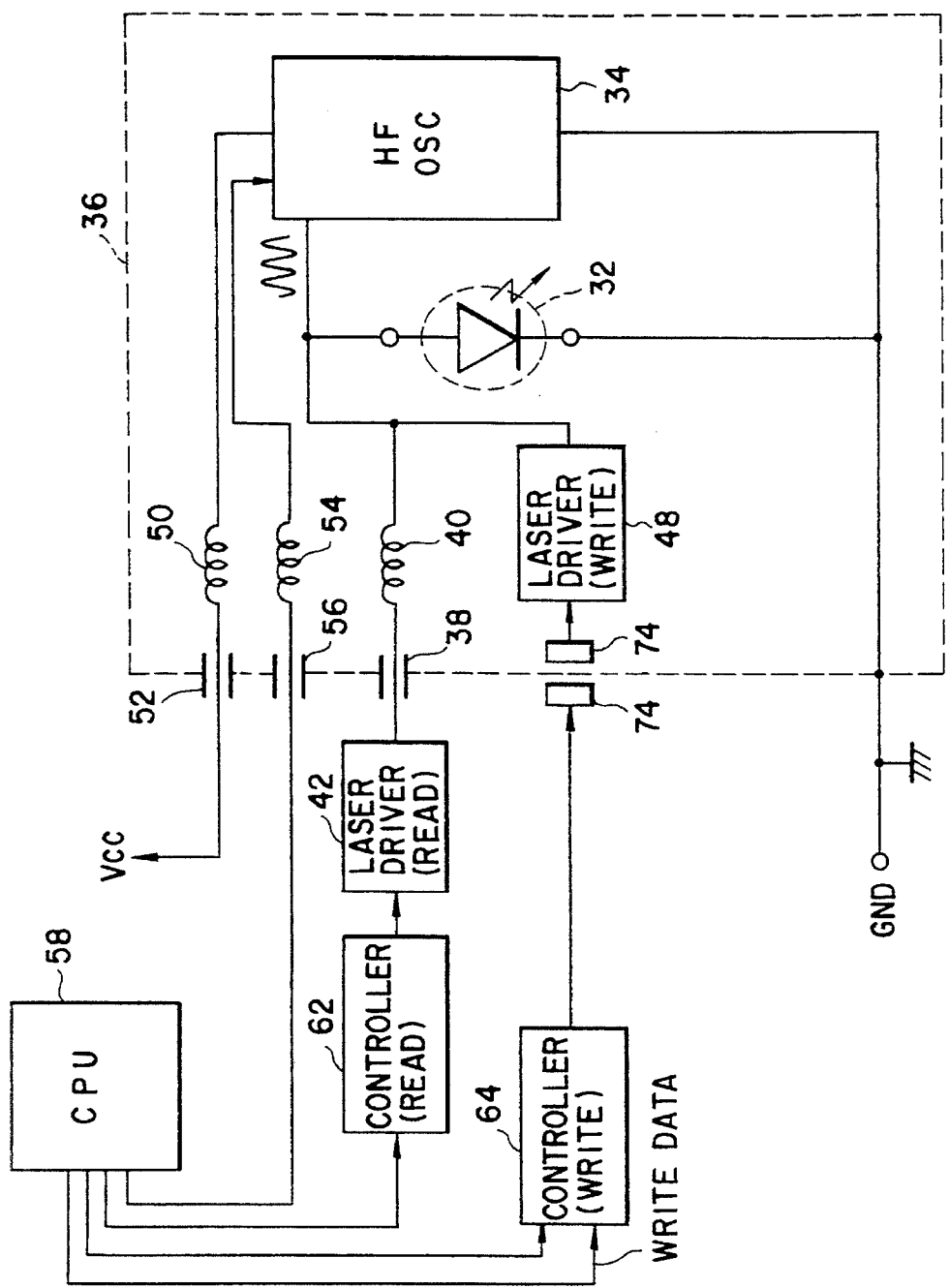
FIG. 8 is a block diagram of a fifth embodiment of a laser driving apparatus according to the present invention.

FIG. 8 is a block diagram showing a driving system and a control system of a semiconductor laser of an optical data recording/reproducing apparatus according to the fifth embodiment of the present invention.

In the fifth embodiment, the switch 60 which is used in the first embodiment is omitted, and the write laser driver 48, instead of the diode 46, is arranged and connected inside the shield case 36. In addition, a photocoupler 74 is used instead of the feedthrough capacitor 44. The photocoupler 74 couples the write controller 64 and the write laser driver 48 with light; that is, these components are separated electrically. Therefore, since these parts are kept separated in both the read mode and the write/erase mode, no undesired radiation leaks from the system including the write controller 64. The rest of the arrangement, operation, and effect are identical with those of the first embodiment.

Figure 10:
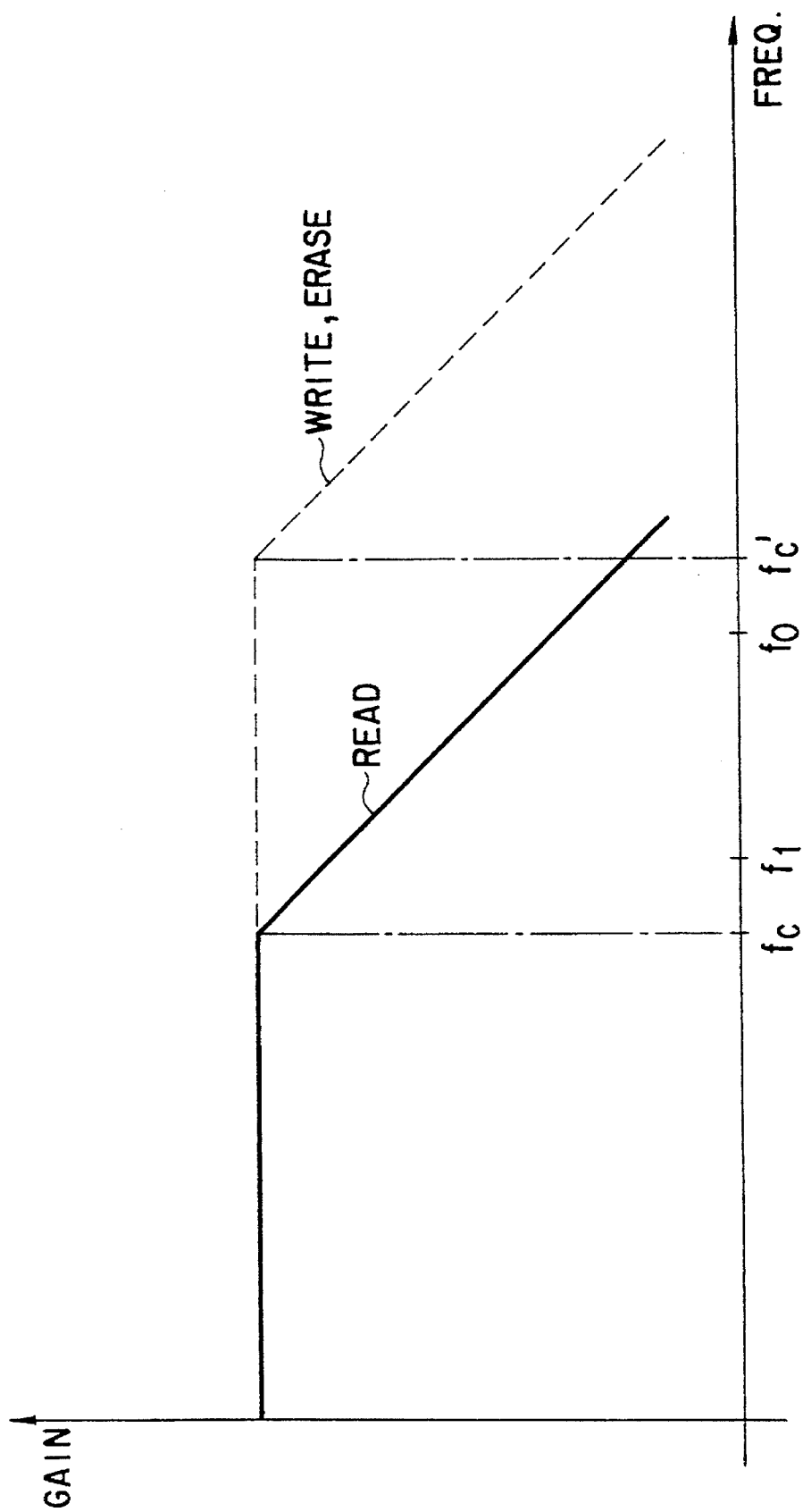
FIG. 10 is a graph showing the characteristic of a filter circuit of the sixth embodiment.

FIGS. 9 and 10 relate to the sixth embodiment of the present invention. FIG. 9 is a block diagram showing a driving system and a control system of a semiconductor laser of an optical data recording/reproducing apparatus. FIG. 10 is a graph showing the characteristic of a diode.

The semiconductor laser (laser diode) 32 is a light source of an optical head (not shown) and is driven in a read mode, a write mode, and an erase mode. This semiconductor laser 32 irradiates laser light for performing read, write, and erase of data onto an optical recording medium.

The semiconductor laser 32 is housed in the shield case 36 together with the HF oscillator 34, an undesired radiation preventing circuit, and the like circuit. The HF oscillator 34 is driven only in the read mode to reduce laser noise during the read operation.

The semiconductor laser 32 is driven by a read/write laser driver 76 via the feedthrough capacitor 38 and the coil 40 which constitute the undesired radiation preventing circuit. In the read mode, the read/write laser driver 76 supplies a read drive current to the semiconductor laser 32. Note that verification can also be performed in the read mode. In the write mode, the read/write laser driver 76 supplies a write drive current to the semiconductor laser 32. In the erase mode, the read/write laser driver 76 supplies an erase drive current to the semiconductor 32.

One end of the coil 40 is connected to the anode of the semiconductor laser 32. The cathode of the semiconductor laser 32 is connected to GND, i.e., grounded via the shield case 36.

A switch 78 whose opening/closing is controlled by the CPU 58 is connected in parallel with the two ends of the coil 40. The CPU 58 supplies a control signal for controlling the opening/closing to the switch 78 through a feedthrough capacitor 80. Note that the CPU 58 controls at least the laser driving system illustrated in FIG. 9.

The switch 78 is turned off in the read mode and turned on in the write and erase modes by the control signal from the CPU 58, thereby switching the circuit constants (more specifically, the inductance of the coil 40) of the undesired radiation preventing circuit added to the drive line of the semiconductor laser 32.

The HF oscillator 34 is connected to the oscillator power supply Vcc (e.g., +5 V) via the coil 50 and the feedthrough capacitor 52 which constitute the undesired radiation preventing circuit. The HF oscillator 34 superposes an HF current on the drive current of the semiconductor laser 32 via an internal coupling capacitor (not shown). The HF oscillator 34 is connected to the CPU 58 via the coil 54 and the feedthrough capacitor 56 constituting the undesired radiation preventing circuit. Consequently, the on/off driving of the HF oscillator 34 is controlled by the CPU 58.

The feedthrough capacitors 38, 80, 52, and 56 extend through and are fixed to the shield case 36. LC filters (the coils 40, 50, and 54 and the feedthrough capacitors 38, 80, 52, and 56) prevent radiation of the HF current to outside the case 36. With this HF superposition, the semiconductor laser 32 can oscillate at a stable, low noise level without being influenced by an optical system of the optical head.

The read/write laser driver 76 is controlled by a read/write controller 82 which is controlled by the CPU 58. The read/write controller 82 receives write data from the CPU 58 and modulates the data.

The switch 78 is turned on/off by a control signal from the CPU 58. That is, the switch 78 is turned off in the read mode and turned on in the write and erase modes. This turning on/off of the switch 78 varies the circuit constant, i.e., the cutoff frequency of the LC filter circuit (the feedthrough capacitor 38 and the coil 40) constituting the undesired radiation preventing circuit.

In the read mode, the LC filter circuit constituted by the feedthrough capacitor 38 and the coil 40 reduces undesired radiation in order to enhance the undesired radiation preventing effect.

The cutoff frequency fc of the LC filter circuit is given by the following equation.

$$fc = \frac{1}{2\pi\sqrt{LC}} \qquad (1)$$

In the read mode, the cutoff frequency fc of the LC filter circuit for preventing undesired radiation is set to a value at which a high undesired radiation preventing effect is obtained. That is, since the switch 78 is turned off in the read mode, the coil 40 is connected in this state, and this attenuates HF components as indicated by the solid line in FIG. 10. It is necessary to set this cutoff frequency fc to be lower than at least the frequency $f_0$ of a high frequency wave generated by the HF oscillator 34. Undesired radiation to the outside is prevented by sufficient attenuation of the HF component f0.

In the write and erase modes, on the other hand, the switch 78 is turned on to short the ends of the coil 40. Consequently, the cutoff frequency as the circuit constant of the LC filter circuit is switched to the high value. When the switch 78 is turned on, L in the circuit becomes a small value corresponding only to a stray inductance which is due to, e.g., a wiring pattern. Therefore, the cutoff frequency shifts to a high frequency fc' as indicated by the broken line in FIG. 10. The signal transmission characteristics can be extended to high frequencies since this frequency fc' becomes higher than an upper-limiting frequency f1 of the bandwidth in the write drive current (write data) supplied from the read/write laser driver 76. Therefore, as in the previous embodiments, recording at high frequencies is possible in this embodiment. Note that, in FIG. 10, the frequency fc' is set to be higher than the frequency $f_0$ of the high frequency wave generated by the HF oscillator 34. However, this value need only cover at least the frequency band $f_1$ of the modulated write data and therefore can be smaller than $f_0$.

In the sixth embodiment with the above arrangement, the output from the semiconductor laser 32 is kept constant by the read/write laser driver 76 in the read mode. The HF oscillator 34 is driven by the CPU 58 only in the read mode, applying the HF current to the semiconductor laser 32, reducing semiconductor laser noise during the read operation. This makes a stable read operation possible. In addition, since the switch 78 is kept OFF, the coil 40 is inserted into the driving system of the semiconductor laser 32 to activate the undesired radiation preventing circuit. This reduces undesired radiation.

In the write and erase modes, on the other hand, the read/write laser driver 76 controls driving of the semiconductor laser 32, thereby performing write and erase of data. The switch 78 is turned on to set the cutoff frequency of the LC filter circuit between the read/write laser driver 76 and the semiconductor laser 32 to a sufficiently high value. Therefore, data at high frequencies can be processed.

Note that in the write and erase modes, the HF oscillator 34 is not driven under the control of the CPU 58, and so no undesired radiation resulting from HF oscillation is generated.

In this embodiment, the constant of the undesired radiation preventing circuit added to the driving system of the semiconductor laser is switched from the value in the read mode to the value in the write and erase modes, and vice versa. By this switching, the undesired radiation preventing effect is enhanced in the read mode in which noise reduction by the HF oscillator 34 is required. In addition, the semiconductor laser 32 can be driven with the data transmission characteristics extended to high frequencies in the write and erase modes in which noise reduction is unnecessary. In this embodiment as discussed above, signals with high frequencies meeting requirements for a high density, a high speed, and a high transfer rate can be written and read without degrading the effect of preventing undesired radiation. Also, in this embodiment, it is possible to stop superposition of HF oscillation in the write and erase modes. This prevents the laser from exceeding the rated output, making it possible to prolong the life of the semiconductor laser.

FIG. 11 is a block diagram showing a driving system and a control system of a semiconductor laser of an optical data recording/reproducing apparatus according to the seventh embodiment of the present invention.

In the seventh embodiment, the cutoff frequency of a circuit can be switched by a switching device, e.g., a transistor 84, instead of the switch 78 of the sixth embodiment. In the seventh embodiment, the switching speed is improved by performing switching between the read mode and the write and erase modes by the use of a semiconductor switching device such as a transistor. This is effective to increase the processing speed of the whole apparatus.

Also, in this embodiment, the on/off control of the HF oscillator 34 is performed by controlling power supply to the HF oscillator 34 by using a switch 86. That is, in the write and erase modes, the switch 86 is connected to GND of the shield case 36 to stop the power supply, under the control of the CPU 58. In the read mode, on the other hand, the switch 86 is connected to the power supply Vcc (e.g., +5 V) to allow HF oscillation. As in FIG. 11, this makes the use of the feedthrough capacitor 56 and the coil 54 shown in FIG. 9 in the undesired radiation preventing circuit unnecessary.

The rest of the arrangement, an operation, and an effect are identical with those of the sixth embodiment.

Note that, in place of the feedthrough capacitor 80, the photocoupler 74 can be arranged at that position as shown in the fifth embodiment (FIG. 8). This photocoupler 74 couples the CPU 58 and the switch 78 or the transistor 84 with light. These parts are separated electrically in both the read mode and the write and erase modes. Therefore, this separation prevents a leak of undesired radiation from this control line during the read operation.

FIG. 12 relates to the eighth embodiment of the present invention. FIG. 12 is a block diagram showing a driving system and a control system of a semiconductor laser of an optical data recording/reproducing apparatus.

In this embodiment, a diode 88 is used in place of the switch 78 of the sixth embodiment. This diode 88 is connected in parallel with the two ends of the coil 40. The anode of the diode 88 is connected to the feedthrough capacitor 38, and its cathode is connected to the semiconductor laser 32. A switching operation of the diode 88 is not externally controlled (by the CPU 58); the diode is turned on/off in accordance with its characteristic shown in FIG. 4. Therefore, the feedthrough capacitor 80 used in the previous embodiments is unnecessary.

In the eighth embodiment with the above arrangement, the HF oscillator 34 is driven only in the read mode by the CPU 58 as described above, applying an HF current to the semiconductor laser 32, and reducing semiconductor laser noise during the read operation. This allows a stable read operation.

As shown in FIG. 4, the diode 88 is not turned on unless a bias of a voltage +VA, e.g., +0.5 V or higher is applied. Since the semiconductor laser 32 is driven with a constant current in the read mode, the voltage generated across the ends of the coil 40 is nearly 0 (V), and so the diode 88 is in an OFF state. When the HF current is superposed on the laser drive signal, one terminal of the coil 40 connected to the laser diode 32 varies a little. If the amplitude of this variation is large and the frequency is low, the diode 88 is turned on/off in accordance with this variation so that the LC filter does not function. However, the amplitude of this variation is not so large that makes the diode 88 turn on/off. Therefore, undesired radiation of signals with small amplitudes is reduced by an undesired radiation preventing circuit constituted by the coil 40 and the feedthrough capacitor 38.

In the write mode, on the other hand, a read/write laser driver 76 pulse-drives the semiconductor laser 32. At this time, the inductance of the coil 40 increases to generate a voltage across its ends. When the bias becomes a predetermined voltage ($+V_A$) or higher, the diode 88 is turned on in accordance with the characteristic in FIG. 4, flowing a semiconductor laser driver current through the diode 88.

In addition, since the HF oscillator 34 is OFF in this state, no undesired radiation caused by the HF oscillator 34 is produced.

In this embodiment, the circuits are switched in accordance with the difference between the signals supplied in the read mode and the write mode. Therefore, it is not required to perform switching by applying a control signal as in the sixth and seventh embodiments. This makes the use of the arrangement for generating the control signal and the feedthrough capacitor 80 unnecessary, resulting in simplification of the circuit configuration and a low cost. Furthermore, since no control signal input terminal need be provided to a shield case 36, a leak of undesired radiation can be effectively prevented.

FIG. 13 shows the arrangement of a laser driving apparatus according to the ninth embodiment of the present invention. In the sixth embodiment and the like, write and read are performed by a common semiconductor laser. In this ninth embodiment, however, write (and erase) laser light and read laser light are generated by respective dedicated semiconductor lasers, i.e., a write semiconductor laser 92 and a read semiconductor laser 94, rather than by a common semiconductor laser.

This laser driving apparatus includes the write semiconductor laser 92 for generating a write beam, the read semiconductor laser 94 for generating a read beam, the CPU 58 for controlling the whole apparatus, an HF superposing module incorporating the HF oscillator 34 for reducing noise, and a write laser driver 96 and a read laser driver 98 for driving the write semiconductor laser 92 and the read semiconductor laser 94, respectively.

The write semiconductor laser 92 and the read semiconductor laser 94 are housed in, e.g., a common metal case 100 which is connected to GND. The HF superposing module including the HF oscillator 34 is also covered with the metal shield case 36 connected to GND.

A power terminal 34a of the HF oscillator 34 is connected to a power line 104 provided outside the shield case 36 via the coil 50 arranged inside the shield case 36 and the feedthrough capacitor 52 attached to the shield case 36. This power line 104 is connected to a power supply circuit (not shown) to supply a predetermined voltage vcc (e.g., +5 V) to the HF oscillator 34. The coil 50 and the feedthrough capacitor 52 inserted in the power line 104 prevent an HF signal of the HF oscillator 34 from leaking to the outside through the power line 104.

A control terminal 34b of the HF oscillator 34 by which on/off of HF oscillation is performed is connected to one end of a control line 106 arranged outside the shield case 36 via the coil 54 and the feedthrough capacitor 56. The other end of the control line 106 is connected to the CPU 58. The CPU 58 performs on/off control of HF superposition through this control line 106.

The CPU 58 is connected to the read laser driver 98 and the write laser driver 96 through lines 108a and 110a, respectively, and controls their operations through these lines. The read laser driver 98 is connected to one end of a feedthrough capacitor 112 attached to the case 36 through a drive line 108b. The write laser driver 96 is connected to one end of a feedthrough capacitor 114 attached to the case 36 through a drive line 110b.

The other terminal of the feedthrough capacitor 112 is connected to a drive line 118, which is connected to an HF oscillation output terminal 34c of the HF oscillator 34, via a coil 116 inside the case 36. The drive line 118 is connected to the anode of the read semiconductor laser 94. The cathode of the read semiconductor laser 94 is connected to the case 100 or GND. Therefore, the read semiconductor laser 94 is supplied with a read drive current 98I from the laser driver 98, and an HF oscillation output current 34I from the HF oscillator 34, which is superposed on the drive current.

The feedthrough capacitor 112 and the coil 116 are provided in the middle of the drive line 108 connected to the HF oscillation output terminal 34c of the HF oscillator 34, preventing a leak of undesired radiation from the lines 108a and 108b to outside the case 36.

The other terminal of the feedthrough capacitor 114 is connected to the anode of the write semiconductor laser 92 through a drive line 120 inside the case 36. The cathode of the write semiconductor laser 92 is connected to the case 100 or GND. In the write or erase mode, the laser driver 96 supplies a write or erase drive current 96I to the write semiconductor laser 92 through the drive lines 110b and 120, thereby allowing the write semiconductor laser 92 to perform write emission or erase emission.

The characteristics of filters constituted by the feedthrough capacitor 52 and the coil 50, the feedthrough capacitor 56 and the coil 54, and the feedthrough capacitor 112 and the coil 116 exhibit low-pass characteristics by which low-frequency components are passed.

For example, the low-pass filter formed by the feedthrough capacitor 112 and the coil 116 has a relation $fc<f_{osc}$, where fc is the cutoff frequency of the low-pass filter and $f_{osc}$ is the oscillation frequency of the HF oscillator 34. This frequency characteristic is illustrated in FIG. 14. The cutoff frequency fc of this low-pass filter is given by Equation (1) presented earlier.

The frequency characteristics of the other low-pass filters constituted by the feedthrough capacitor 52 and the coil 50 and the feedthrough capacitor 56 and the coil 54 can be substantially the same as that of the low-pass filter constituted by the feedthrough capacitor 112 and the coil 116.

Since the power line 104 need only have a function of transmitting almost only DC components, however, the cutoff frequency of the low-pass filter consisting of the feedthrough capacitor 52 and the coil 50 can be lower. Likewise, the cutoff frequency of the low-pass filter consisting of the feedthrough capacitor 56 and the coil 54 can be lower than fc.

Of the components of the HF output current 34I from the HF oscillator 34, a component reflected by the read semiconductor laser 94 due to impedance mismatching and a component leaking to the coil 116 give rise to undesired radiation if they flow as a current 116I to outside the HF superposing module. However, this undesired radiation is prevented from leaking to the outside by the characteristics of the low-pass filters.

In this embodiment, the drive lines (i.e., the lines 108b and 118) of the read semiconductor laser 94 and the drive lines (i.e., the lines 110b and 120) of the write semiconductor laser 92 are separated. Therefore, the filter constant of the read drive lines can be set independent of the frequency characteristic of the write system.

On the other hand, the write or erase drive current 96I from the write laser driver 96 is supplied to the write semiconductor laser 92 via the feedthrough capacitor 114 alone. Although this feedthrough capacitor 114 is not necessarily required, it is used to facilitate sealing. Since almost neither of the HF current 34I or 116I leaks into the drive line 120, it is sometimes not necessary to insert a filter as a countermeasure against undesired radiation.

In the ninth embodiment as discussed above, the frequency characteristic of the write system can be set independent of the HF oscillation frequency $f_{osc}$. Consequently, it is possible to realize a semiconductor laser driving apparatus capable of effectuating both suppression of undesired radiation as radio interference and a high frequency band of the write system, i.e., a high write transfer rate.

In addition, when this apparatus is combined with a semiconductor laser, such as a monolithic semiconductor laser, in which a plurality of chips are incorporated into a single package, the semiconductor laser can be mounted in the vicinity of the HF superposing module package. This makes it possible to miniaturize the apparatus and shorten the transmission lines.

Note that the connection of the LC filters is not limited to the one in the above embodiment but may be of another type, e.g., a T type or a π type. In addition, the number of semiconductor lasers is not limited to two, i.e., read and write semiconductor lasers. That is, it is also possible to connect an HF oscillator and a filter to at least one read semiconductor laser, and to provide a plurality of semiconductor laser lines independent of that read semiconductor laser.

Furthermore, it is unnecessary to connect the shield case 36 of the HF superposing module electrically and mechanically with all of two or more semiconductor lasers. That is, not all semiconductor lasers need be mechanically connected.

FIG. 15 shows the arrangement of an optical system according to the tenth embodiment of the present invention in which the present invention is applied to a laser driver for a magneto-optical disk recording/reproducing apparatus. In this embodiment, a laser driving apparatus is constituted by using a two-beam semiconductor laser 122 consisting of two read and write semiconductor laser chips 122a and 122b formed in a monolithic fashion, instead of the write semiconductor laser 92 and the read semiconductor laser 94 used in the ninth embodiment.

A pickup 126 is arranged to oppose one surface of a magneto-optical disk 124, and a magnetic head 128 is arranged to oppose the other surface of the disk 124. The two-beam semiconductor laser 122 is formed by mounting the low-output read semiconductor laser chip 122a and the high-output write/erase semiconductor laser chip 122b in a monolithic manner. Light output from the two-beam semiconductor laser 122 is controlled in accordance with instructions from a CPU 130 via laser drivers 132a and 132b and an HFM (high-frequency superposing module: the circuit except for the semiconductor laser in the shield case 36 shown in FIG. 13) 134. Although the HFM 134 is interposed between the laser drivers 132a and 132b and the semiconductor laser chips 122a and 122b, a portion of the drive line is passed through the HFM 134, as in the case of FIG. 13.

The output light from the semiconductor laser 122 is collimated into parallel light by a collimator 136 and split into reflected light and transmitted light by a polarization beam splitter 138. The reflected light is received by a photodetector 140 as an exit light monitor for the semiconductor laser 122. The transmitted light is focused on the disk 124 by an objective lens 142, forming a small spot of the diffraction limit.

In the erase mode, the CPU 130 sends an instruction to cause the high-output semiconductor laser chip 122b to emit light and controls a magnetic head driver 144 to make the magnetic head 128 generate a magnetic field in the direction of erase. In the write mode, the magnetic head driver 144 is so controlled as to generate a magnetic field in the opposite direction.

The light reflected by the disk 124 is reflected by the polarization beam splitter 138 and split into read light and write/erase light by a dichroic mirror 146 which functions as a beam splitter with a wavelength selectivity. In this embodiment, a lens 148, a cylindrical lens 150 whose axis is inclined 45° from the exit surface of the dichroic mirror 146, and a photodiode 152 detect both focus-error and track-error signals from the write/erase light reflected by the dichroic mirror 146.

The plane of polarization of the light transmitted through the dichroic mirror 146 is rotated 45° through a halfwave plate 154 with an azimuth angle of 22.5°. The transmitted light is then condensed by a lens 156, and the magneto-optical signal is read by a polarization beam splitter 158, both the S-polarized light reflectance and the P-polarized light transmittance of which are 100%, photodetectors 160a and 160b, and a differential operation circuit (not shown).

In this embodiment, the detection of the focus-error and track-error signals is performed by detecting the reflected light from the dichroic mirror 146. However, this detection can also be performed by using the transmitted light.

FIG. 16 is a view showing the positional relationship between light spots formed on the disk 124 by using the optical system in FIG. 15. On the disk 124, tracks 166 are formed by alternately providing lands 162 and grooves 164 adjacent to each other. The disk 124 is scanned in, e.g., the direction indicated by an arrow 168. Data write is performed by forming a write domain 172 by a leading light spot 170 which is irradiated on the land 162. The write domain 172 is read by a trailing light spot 174.

The leading light spot 170 performs data erase/write, and the trailing light spot 174 performs data read. In performing optical modulation recording, verification is performed with the light spot 174 while the quantity of light of the light spot 170 is modulated. In performing magnetic modulation recording, overwrite is performed by modulating the magnetic head 128 at a high speed while the light spot 170 is emitted with a direct current at a high output, and verification is performed with the light spot 174. Write and verification can be done at the same time by independently controlling these two beams, and this realizes a high write transmission rate.

Band broadening is required when a large number of pulses for multi-emission are to be generated, as when multi-emission is performed for a write compensation purpose in order that write marks formed by light spots have a stable width. This embodiment is also applicable to this use.

Note that the laser driving apparatus shown in FIG. 13 can be applied to the optical system in FIG. 15.

FIG. 17 shows a semiconductor laser driving apparatus according to the eleventh embodiment of the present invention. This embodiment is the same as the ninth embodiment shown in FIG. 13 except that a resistor 180 is provided on the drive line 120 of the write semiconductor laser 92.

In the eleventh embodiment, magnetic modulation recording is assumed, and so modulation of write data is performed by a magnetic head. The setting of the constants of the feedthrough capacitor 112 and the coil 116 on the drive line 108b of the read semiconductor laser 94 is the same as in the ninth embodiment (FIG. 13), and a description thereof will be omitted.

In the magnetic modulation recording, the frequency of a drive current to the write semiconductor laser 92 can be nearly a direct current. Therefore, a capacitance C of the feedthrough capacitor 114 and a resistance R of the resistor 180 need only constitute a low-pass filter whose cutoff frequency fc is given by:

$$\text{Cutoff frequency } fc = \frac{1}{2\pi CR}$$

With this arrangement, it is possible to remove unwanted high-frequency noise from the write semiconductor laser drive current while suppressing undesired radiation. Consequently, direct overwrite and simultaneous verification are made feasible by use of the two-beam semiconductor laser, resulting in a high write transfer rate.

FIG. 18 shows major components of a semiconductor laser driving apparatus according to the twelfth embodiment of the present invention. This embodiment is different from the ninth embodiment in that the current drive line 110b of the laser driver 96 is connected directly to the write semiconductor laser 92 without being connected to the feedthrough capacitor 114 used in the ninth embodiment (FIG. 13). That is, the current drive line 110b of the laser driver 96 is connected to the write semiconductor laser 92 without being passed through the shield case 36. The rest of the arrangement is identical with that of the ninth embodiment illustrated in FIG. 13.

FIG. 19 shows a schematic arrangement of the thirteenth embodiment of the present invention. A series circuit of a capacitor 202, a switch 203, and an HF oscillator 204 is connected in parallel with a semiconductor laser (laser diode) 201. The cathode of the semiconductor laser 201 is grounded, and its anode is connected to a laser driver 208 via a coil 205. The connecting point between the semiconductor laser 201 and the coil 205 is connected to the laser driver 208 via a coil 206 and a switch 207.

Figure 1:
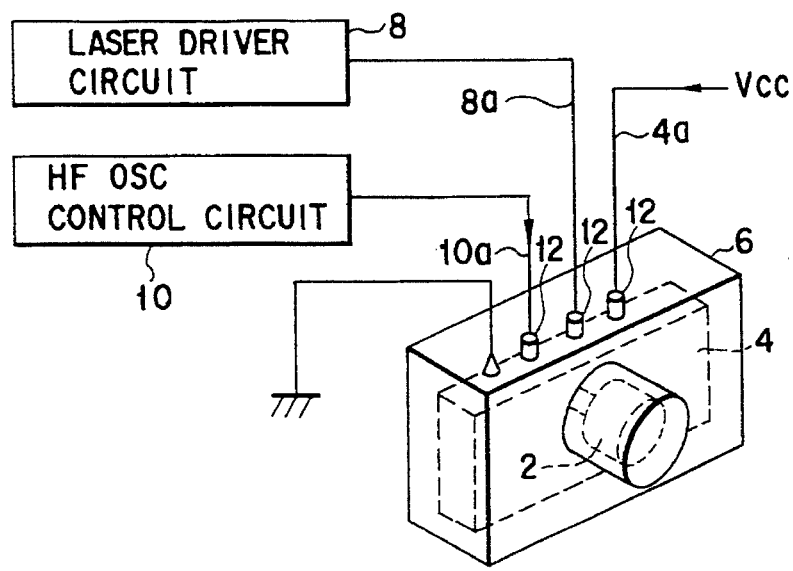
FIG. 1 is a block diagram schematically showing a conventional laser driving apparatus in which a laser driver circuit is arranged outside a shield case.
Figure 2:
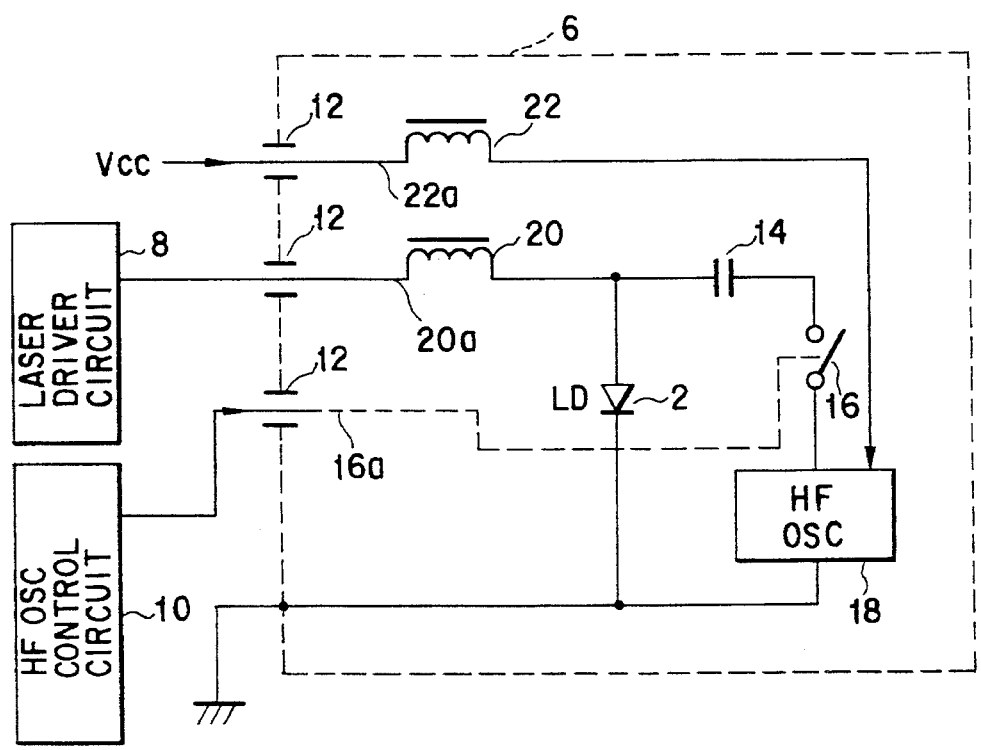
FIG. 2 is a block diagram of a conventional high-frequency oscillator circuit included in the laser driving apparatus shown in FIG. 1.

The HF oscillator 204 and the laser driver 208 are similar to the HF oscillator circuit 18 and the driver circuit 8 shown in FIG. 2.

The coils 205 and 206 constitute an LC filter coil. As in FIG. 20A, the coils 205 and 206 are so magnetically coupled as to have a common magnetic circuit. When currents are flowed in the same direction through the coils 205 and 206, the coils 205 and 206 generate magnetic fluxes in opposite directions inside the coils. The coils 205 and 206 are magnetically anti-coupled with each other. Therefore, when the switch 207 is turned on to flow currents A and B in the directions indicated by arrows in FIG. 20A through the coils 205 and 206, a magnetic flux Φ1 generated by the coil 205 and a magnetic flux Φ2 generated by the coil 206 cancel each other out. Consequently, the changes in the internal magnetic fluxes of the coils 205 and 206 with respect to the currents flowing through the coils 205 and 206 decrease, with the result that effective inductances become small values close to 0. A practical arrangement of the coils 205 and 206 may be a double-winding aircore coil as shown in FIG. 20A. However, to enhance the flux canceling effect by improving the coupling between the coils, it is more preferable to wind two coils on a core 200 made of a magnetic material, as in FIG. 20B. The material of the core 200 is desirably one having a high permeability in a recording frequency band (a few ten MHz), e.g., ferrite or a thin metal film.

Referring back to FIG. 19, the on/off states of the switch 203 of the HF oscillator 204 and the switch 207 of the coil 206 are controlled by a switch controller 209.

The semiconductor laser 201, the capacitor 202, the switch 203, and the HF oscillator 204 are arranged as an HF superposing circuit inside a shield case 210, whereas the switch 207, the laser driver 208, and the switch controller 209 are arranged outside the case 210. Feedthrough capacitors 224, 226, and 228 are inserted between the shield case 210 and a line 218 connecting the laser driver 208 and the coil 205, between the shield case 210 and a line 220 connecting the switch 207 and the coil 206, and between the shield case 210 and a line 222 connecting the switch controller 209 and the switch 203, respectively.

A controller 212 sends control commands to the laser driver 208 in the write or read mode and gives a data signal corresponding to write data in the write mode. The controller 212 sends control commands to the switch controller 209.

An operation of the thirteenth embodiment with the above arrangement will be described below.

In the write mode (including erase mode), the switch controller 209 turns on the switch 207. Consequently, an HF current which is output from the laser driver 208 and modulated by write data flows through both the coils 205 and 206. Since the coils 205 and 206 generate magnetic fluxes in opposite directions when currents are flowed in the same direction, the changes in the internal magnetic fluxes decrease compared to the currents flowing through the coils 205 and 206. As a result, the effective inductances become small values close to 0. In addition, the switch controller 209 turns off the switch 203 to stop oscillation of the HF oscillator 204.

In the write mode, therefore, the HF current supplied from the laser driver 208 and modulated by write data can be supplied to the semiconductor laser 201 without being influenced by the inductances that the coils 205 and 206 independently have. This makes it possible to drive the semiconductor laser 201 at a high density and a high speed.

In the read mode, on the other hand, the switch controller 209 turns off the switch 207. Consequently, a constant current from the laser driver 208 is supplied to the semiconductor laser 201 only through the coil 205. At the same time, the switch controller 209 turns on the switch 203 to allow the HF oscillator 204 to start oscillating, thereby superposing an HF current on the semiconductor laser 201 via the capacitor 202.

The coil 205 has an intrinsic inductance with respect to the current from the HF oscillator 204. Therefore, assuming that the inductances of the coils 205 and 206 are about 100 nH and the capacitance of the feedthrough capacitor 226 of the shield case 210 is about a few ten pF, an HF current of several hundred MHz generated by the HF oscillator 204 is cut off by the filter formed by the coil 205 and the feedthrough capacitor 224 and is thereby prevented from leaking outside the shield case 210 through the line 218.

In the thirteenth embodiment as discussed above, the filter coil connected between the semiconductor laser 201 and the laser driver 208 consists of the two coils 205 and 206 so magnetically coupled as to have a common magnetic circuit, and these coils 205 and 206 generate magnetic fluxes in opposite directions inside themselves when currents are flowed in the same direction through them. This makes it possible to control the inductances by using the external switch 207 in the write and read modes. Consequently, it is possible to prevent the HF superposed signal from leaking outside the shield case 210 during the read operation without degrading the high-speed drive performance of the laser during the write operation.

In particular, in this embodiment, since the coil 205, i.e., an inductor is inserted into the line 218 connected to the laser driver 208, no noise leaks from the line 220 although the switch 207 is provided outside the shield case 210. This makes it possible to use, as the switch 207, a component which is difficult to miniaturize, such as a relay whose contact resistance is low in an ON state, outside the shield case 210. The potential difference between the two ends of the coil 205 or 206 in the write mode is only the potential difference derived from the resistance of the coil 205 or 206. Therefore, when small coils with a small number of turns are used as these coils 205 and 206, the resistance can be decreased to be negligibly low. Consequently, it is possible to decrease the potential to be one-tenth or less the forward voltage (about 0.7 V) in a short circuit caused by a conventional semiconductor switch.

From the standpoint of the laser driver 208, therefore, the load potential on the semiconductor laser 201 is the forward voltage (about 2 V) of the semiconductor laser 201 alone. This facilitates high-speed, high-current driving of the semiconductor laser 201 even with a low-voltage supply such as a 5-V power supply, and the consumption power of the laser driver 208 can also be reduced.

FIG. 21 shows a schematic arrangement of the fourteenth embodiment of the present invention.

A filter coil is constituted by two coils 231 and 232 and a saturable core 233 which is readily, magnetically saturated.

One end of the coil 231 is connected through a switch 207 to a current source 234 for supplying a direct current, and its other end is grounded. One end of the coil 232 is connected to the laser driver 208, and its other end is connected to the anode of the semiconductor laser 201.

Figure 22:
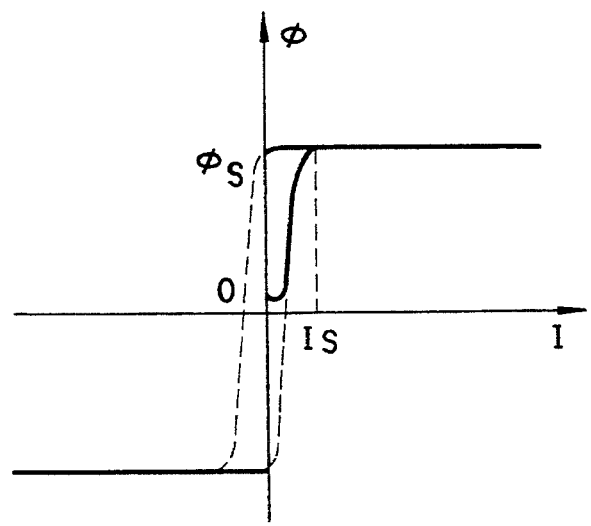
FIG. 22 is a graph showing the magnetic characteristic of a saturable core used in the fourteenth embodiment.

A saturable core 233 reaches saturation with a slight magnetic field generated by the coil 231 and has the magnetic characteristic as shown in FIG. 22. FIG. 22 shows the change in an internal magnetic flux Φ of the saturable core 233 as a function of a coil current I. The saturable core 233 uses a material and a shape by which the magnetic flux changes largely to reach a saturation flux level Φs with a slight current Is flowing through the coil 231. As the material of the core, a metal material with a low coercive force and a large saturation magnetization is used. When the shape of the core is a ring-like closed magnetic circuit with no gap as in FIG. 21, there is no end portion in the core 233. Therefore, the influence of a demagnetizing field is small, so the coil 233 reaches magnetic saturation with a slight current from the coil 231.

The rest of the arrangement is the same as that of the thirteenth embodiment shown in FIG. 19.

An operation of the fourteenth embodiment with the above arrangement will be described below.

In the write mode, the switch controller 209 turns off the switch 203 to stop oscillation of the HF oscillator 204. At the same time, the switch controller 209 turns on the switch 207 to make the current source 234 supply a direct current larger than the saturation direct current Is to the coil 231. This allows the saturable core 233 to cause magnetic saturation, decreasing the flux change in the core 233 to a very small one. Consequently, the effective inductance when viewed from the coil 232 becomes small, resulting in a very low impedance. Therefore, an HF current which is supplied by the laser driver 208 and modulated by write data can be supplied to the semiconductor laser 201 without being influenced by the inductance of the coil 232. This permits high-speed driving of the semiconductor laser 201.

In the read mode, on the other hand, the switch controller 209 turns off the switch 207. Consequently, a fixed current from the laser driver 208 is supplied to the semiconductor laser 201 through the coil 232. Simultaneously, the switch controller 209 turns on the switch 203 to make the HF oscillator 204 start oscillating, thereby superposing an HF current on the semiconductor laser 201 via the capacitor 202.

If, for example, the number of turns of the coil 232 is decreased to prevent magnetic saturation of the core 233 with the current flowing through the coil 232, the core 233 is not magnetically saturated. Therefore, since the coil 232 has an intrinsic inductance with respect to the current from the HF oscillator 204, an HF signal from the HF oscillator 204 is cut off by a filter constituted by the coil 232 and a feedthrough capacitor 224. This prevents a leak of the HF signal to outside the shield case 210 through the line.

In the fourteenth embodiment with the above arrangement, therefore, as in the thirteenth embodiment, the filter coil connected between the semiconductor laser 201 and the laser driver 208 is constituted by the two coils 231 and 232 and the saturable coil 233 which is easily susceptible to magnetic saturation. Consequently, the inductance can be controlled in the write and the read modes by the external switch 207. This makes it possible to drive the semiconductor laser 201 at a high speed during the write operation without sacrificing the noise removing effect during the read operation, as in the thirteenth embodiment.

In this fourteenth embodiment, as in the thirteenth embodiment, a relay whose contact resistance is low in an ON state can be used as the switch 207, and therefore the resulting load potential is also low. Consequently, the semiconductor laser 201 can be driven with a low consumption power by a low-voltage power supply.

Figure 23:
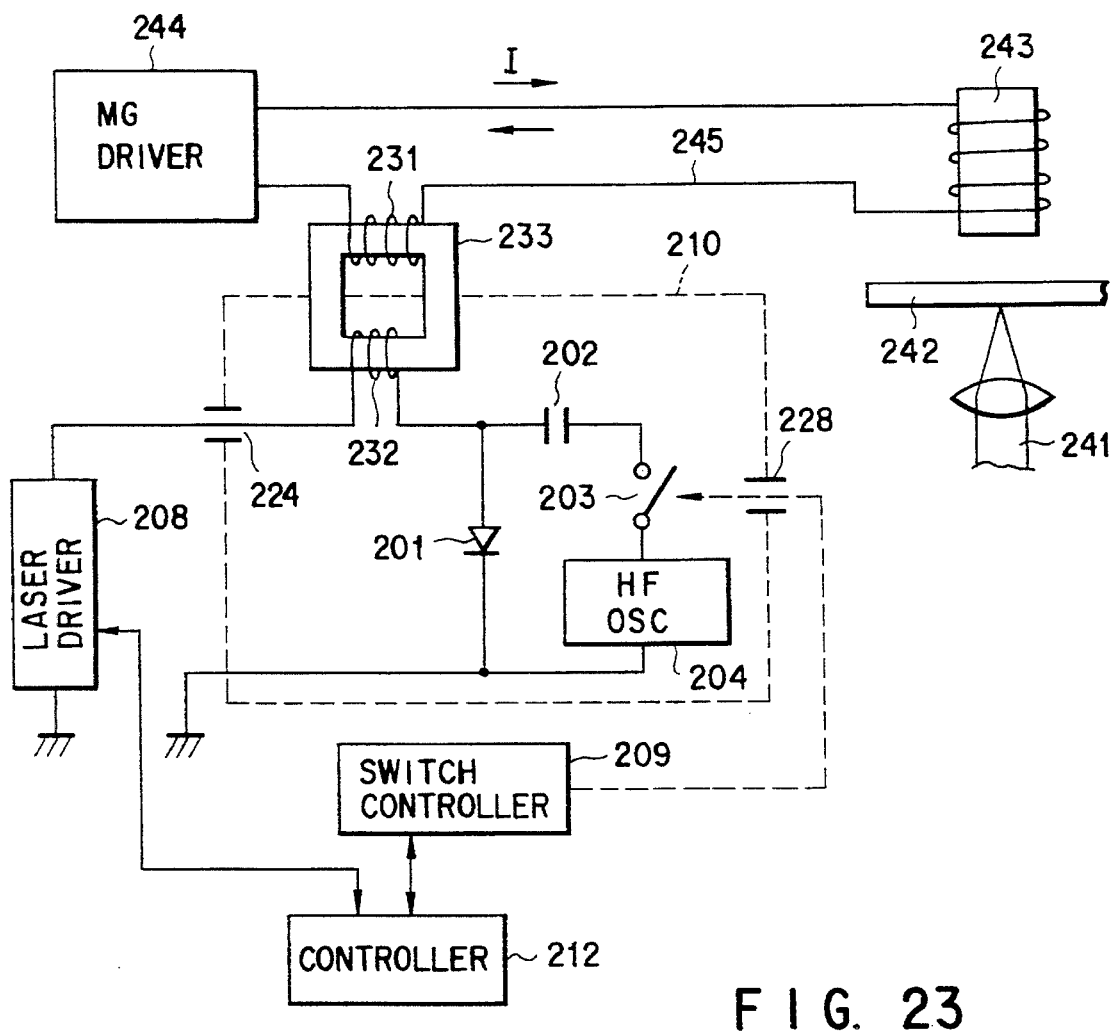
FIG. 23 is a block diagram of a fifteenth embodiment of a laser driving apparatus according to the present invention.

FIG. 23 shows a schematic arrangement of the fifteenth embodiment of the present invention.

The arrangement of a filter coil is basically the same as that described in the fourteenth embodiment except that a coil 231 for controlling the saturated or unsaturated state of a saturable core 233 is connected to a current line 245 of a magnet driver 244 for driving a write/erase electromagnet 243 which is arranged to oppose an optical pickup 241 of a magneto-optical recording apparatus via a magneto-optical disk 242.

A direct current I which flows through the electromagnet 243 in the write and erase modes flows through the coil 231. In the write and erase modes, a large direct current flows in order for the electromagnet 243 to apply a magnetic field to the disk 242. Therefore, the saturable core 233 causes magnetic saturation, and as a consequence the effective inductance from the standpoint of the coil 232 becomes very small.

In the read mode, on the other hand, no current flows through the coil 231 since the magnet driver 244 does not drive the electromagnet 243, and so the inductance of the coil 232 restores its original magnitude. Consequently, an HF signal from the HF oscillator 204 is cut off by a filter constituted by the coil 232 and the feedthrough capacitor 224. This prevents a leak of the HF signal to outside the shield case 210 through the line.

In the fifteenth embodiment with the above arrangement, therefore, it is unnecessary to use the switch 207 for controlling the saturable core 233, the switch controller 209 (although the HF oscillator 204 is necessary), and the current source 234 described in the fourteenth embodiment. Consequently, the inductance of the filter can be controlled with a simple arrangement. In addition, the consumption power can be decreased since no current source is used. Furthermore, since the electromagnet 243 for write and erase operates with a direct current, the load brought about by an increase in the impedance when the current is flowed through the coil 231 is small, having no influence on the original operation.

In particular, the current for driving the write/erase electromagnet 243 is a large current of a few hundred mA or more, although this depends on the coil arrangement, in order to increase the generated magnetic field. This makes it possible to readily saturate the core 233 even with a small number of turns of the coil 231.

Figure 24:
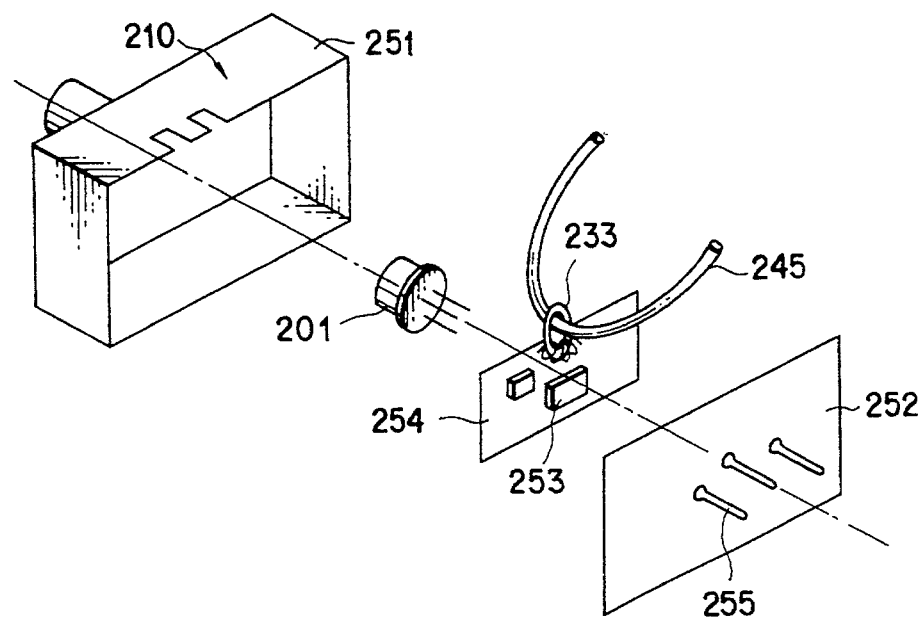
FIG. 24 is a perspective view showing a practical arrangement of the fifteenth embodiment.

FIG. 24 illustrates a practical arrangement of the fifteenth embodiment as discussed above. A substrate 254 mounting an HF oscillator 253 is arranged close to the semiconductor laser 201 inside the shield case 210 which is constituted by conductive members 251 and 252. Pins 255 are for connecting the power line and the signal line of the HF oscillator 253 to equipment outside the shield case 210 through the feedthrough capacitor 224 and a feedthrough capacitor 228.

A nonmagnetic conductive material, e.g., an aluminum or copper plate is used as the material of the shield case conductive members 251 and 252, and the ring core 233 is disposed on the member 251 such that a portion of the core 233 protrudes outside the shield case 210. In this arrangement, the shield case 210 has no magnetic effect on the core 233. Therefore, the core 233 can be magnetically saturated simply by passing the current line 245 of the write/erase electromagnet 243 through the hole of the ring core 233 outside the shield case 210.

Figure 25:
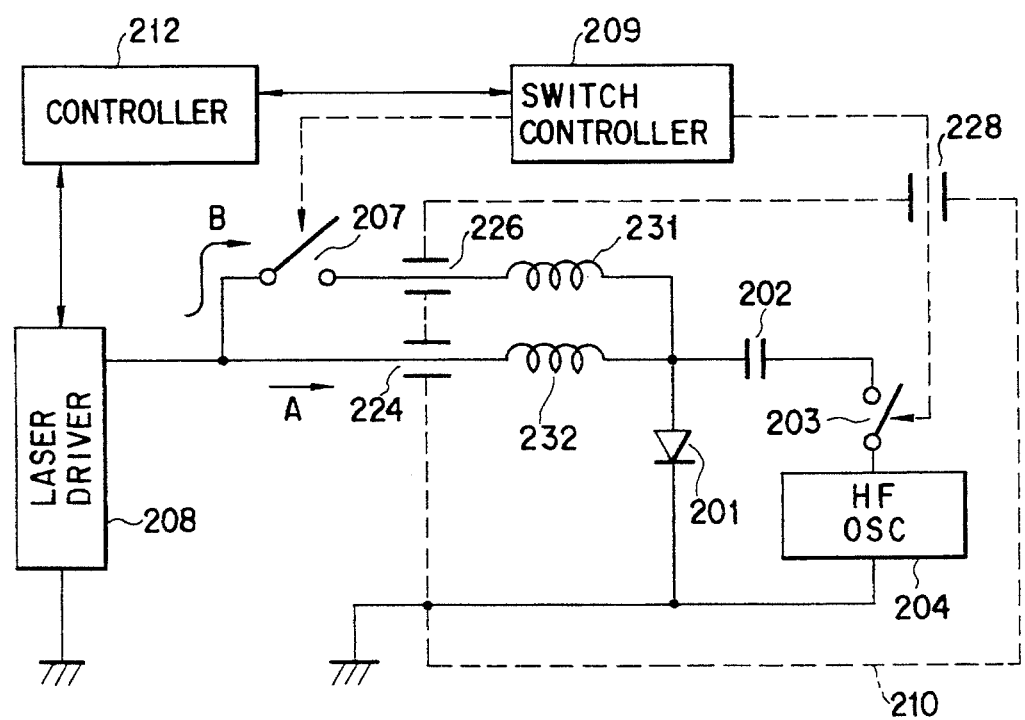
FIG. 25 is a block diagram of a sixteenth embodiment of a laser driving apparatus according to the present invention.

FIG. 25 shows a schematic arrangement of the sixteenth embodiment of the present invention.

A filter coil is constituted by two coils 231 and 232. One end of the coil 231 is connected to one end of the coil 232 and to a laser driver 208 via a switch 207. The other end of the coil 231 is connected to the other end of the coil 232 and to the cathode of a semiconductor laser 201. The rest of the arrangement is identical with that of the thirteenth embodiment (FIG. 19).

In the write mode, the switch controller 209 turns off the switch 203 to stop oscillation of the HF oscillator 204, and turns on the switch 207 to connect the coils 231 and 232 in parallel with each other. Since the effective inductances of the coils 231 and 232 are small, the impedance is very low. Therefore, an HF current supplied from the laser driver 208 and modulated by write data is supplied to the semiconductor laser 201 without being influenced by the inductances of the coils 231 and 232. This allows high-speed driving of the semiconductor laser 201.

In the read mode, the switch controller 209 turns off the switch 207 to disconnect the coil 231, supplying a fixed current from the laser driver 208 to the semiconductor laser 201 only through the coil 232. Simultaneously, the switch controller 209 turns on the switch 203 to cause the HF oscillator 204 to start oscillating, thereby superposing the HF current on the semiconductor laser 201 via a capacitor 202.

Since the coil 232 has an intrinsic inductance to the current from the HF oscillator 204, an HF signal from the HF oscillator 204 is cut off by a filter constituted by the coil 232 and a feedthrough capacitor 224. This prevents the HF signal from leaking outside a shield case 210 through the line.

The sixteenth embodiment with the above arrangement can also accomplish an effect similar to that described in the thirteenth embodiment.

In the present invention as has been discussed above, a write drive signal to be supplied to a semiconductor laser through a write line is not passed through a means for preventing undesired radiation of an HF signal to be superposed on a laser drive signal to reduce noise. Therefore, HF components are not overly cut.

Additionally, the HF oscillator 204 for noise reduction is disconnected from the write line at least in the read mode. This ensures a reliable prevention of undesired radiation.

Since a high density, a high speed, and a high transfer rate are required in the write mode, the circuit constant of a circuit for preventing undesired radiation is set to a value by which these requirements are met. In the read mode, an HF signal is superposed on a read drive signal, and this superposed signal is supplied to the laser to reduce noise. In addition, the circuit constant of the above circuit is switched to a value by which undesired radiation caused by the superposition of the HF signal can be prevented. When separate lasers are to be used for write and read, a filter circuit having characteristics for not transmitting an HF signal onto a drive line of a read laser is provided. Since the characteristics of this filter means can be determined almost independently of the frequency characteristics required in a write operation, the write operation can be performed at a high speed.

The present invention comprises a laser source for outputting data write laser light with a variable intensity and data read laser light with a fixed intensity, an HF oscillator for outputting an HF signal to be superposed on this laser source, a shield case for housing the HF oscillator to prevent propagation of HF noise from the HF oscillator, a driver circuit arranged outside the shield case to generate a drive signal for the laser source, an HF cutoff filter circuit having a coil arranged on a line provided inside the shield case and connecting the driver circuit and the laser source, a flux generating means having a magnetic circuit which is partially shared by the coil of the HF cutoff filter circuit, and an inductance control means for causing the flux generating means to give a flux change, thereby controlling the inductance of the coil such that the inductance in the write mode is smaller than the inductance in the read mode.

The flux generating means has a coil which has the magnetic circuit in common with the coil constituting the HF cutoff filter circuit and is wound in the opposite direction. The inductance control means performs control such that changes in the magnetic flux with respect to currents flowing through the individual coils are decreased during the write operation. Alternatively, the flux generating means has a magnetic core in which the coil constituting the HF cutoff filter circuit is provided. The inductance control means performs control such that the magnetic core is saturated during the write operation.

With the above arrangement, propagation of HF noise from the HF oscillator can be prevented since the HF oscillator for outputting an HF signal to be superposed on the laser source is housed in the shield case. The driver circuit for generating a drive signal to be supplied to the laser source is arranged outside the shield case. Additionally, the HF cutoff filter circuit having the coil on the line connecting the driver circuit and the laser source is also arranged, and the inductance of the coil is controlled such that the inductance in the write mode is smaller than the inductance in the read mode by using a flux change given by the flux generating means having the magnetic circuit which is partially shared by the coil of the HF cutoff filter circuit. That is, the inductance of the HF cutoff filter circuit can be controlled only by causing the flux generating means to give a flux change. Therefore, the laser source can be driven at a high speed with a low consumption power in the write mode. In the read mode, a leak of noise from the HF oscillator to outside the shield case can be prevented.

In addition, the flux generating means has the coil which has the magnetic circuit in common with the coil constituting the HF cutoff filter circuit and is wound in the opposite direction, and the inductance control means performs control such that changes in the magnetic flux with respect to currents flowing through the individual coils are decreased in the write mode. Consequently, the inductance of the HF cutoff filter circuit can be controlled simply by controlling the currents to be supplied to the coils in the write and read modes.

Furthermore, the flux generating means has the magnetic core in which the coil constituting the HF cutoff filter circuit is provided, and the inductance control means performs control such that the magnetic core is saturated in the write mode. This makes it possible to control the inductance of the HF cutoff filter circuit only by saturating the magnetic core in the write and read modes.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording/reproducing apparatus comprising:

light source means for emitting write laser light and read laser light;

a high frequency (HF) oscillating means, connected to said light source means, for supplying an HF signal for reducing laser noise to said light source means;

a shield case for housing said light source means and said HF oscillating means;

write driving means for supplying a write drive signal to said light source means through a write line;

read driving means for supplying a read drive signal to said light source means through a read line provided independently of said write line in at least said shield case; and undesired radiation preventing means, connected to said read line, for preventing undesired radiation of the HF signal from said HF oscillating means.

2. An apparatus according to claim 1, further comprising means for disconnecting said write line from said HF oscillating means at least in a read mode.

3. An apparatus according to claim 2, wherein said connecting means comprises a switch inserted into said write line.

4. An apparatus according to claim 1, wherein said undesired radiation preventing means comprises a low-pass filter.

5. An apparatus according to claim 4, wherein said low-pass filter comprises:

a coil inserted into said read line in said shield case; and a feedthrough capacitor provided in said shield case.

6. A data recording/reproducing apparatus comprising:

light source means for emitting write laser light and read laser light;

high frequency (HF) oscillating means, connected to said light source means, for supplying an HF signal for reducing laser noise to said light source means;

a shield case for housing said light source means and said HF oscillating means;

write driving means for supplying a write drive signal to said light source means through a write line;

read driving means for supplying a read drive signal to said light source means through a read line provided independently of said write line in at least said shield case;

undesired radiation preventing means, connected to said read line, for preventing undesired radiation of the HF signal from said HF oscillating means; and control means for making a circuit constant of said undesired radiation preventing means in a write mode differ from a circuit constant in a read mode.

7. An apparatus according to claim 6, wherein said undesired radiation preventing means comprises a low-pass filter, and said control means comprises means for increasing a cutoff frequency of said low-pass filter in the write mode to be higher than a cutoff frequency in the read mode.

8. An apparatus according to claim 7, wherein said low-pass filter comprises:

a coil inserted into said read line in said shield case; and a feedthrough capacitor provided in said shield case.

9. An apparatus according to claim 8, wherein said control means comprises a switch connected in parallel with said coil, said switch being turned on to short said coil in the write mode and turned off in the read mode.

10. A data recording/reproducing apparatus comprising:

first light source means for emitting write laser light;

second light source means for emitting read laser light;

high frequency (HF) oscillating means, connected to said second light source means, for supplying an HF signal for reducing laser noise to said second light source means;

a shield case for housing said second light source means and said HF oscillating means; and filter means, connected to a drive line of said second light source means in said shield case, for preventing transmission of the HF signal from said HF oscillating means to outside said shield case.

11. An apparatus according to claim 10, wherein said filter means comprises:

a coil inserted into said drive line in said shield case; and a feedthrough capacitor provided in said shield case.

12. A data recording/reproducing apparatus comprising:

light source means for outputting data write laser light with a variable intensity and data read laser light with a fixed intensity;

high frequency (HF) oscillating means for superposing an HF signal on a drive signal for said light source means;

a shield case for housing said HF oscillating means to prevent propagation of noise of the HF signal;

driving means, arranged outside said shield case, for generating the drive signal for said light source means;

HF cutoff filter means having a coil arranged inside said shield case on a signal line connecting said driving means and said light source means; and control means for controlling an inductance of said coil such that an inductance in a write mode is smaller than an inductance in a read mode.

13. An apparatus according to claim 12, wherein said control means comprises:

flux generating means including said coil; and means for changing the inductance of said coil by making a magnetic flux generated by said flux generating means in the write mode differ from a magnetic flux in the read mode.

14. An apparatus according to claim 13, wherein said flux generating means has a coil which has a magnetic circuit in common with said coil and is wound in an opposite direction, and said inductance control means comprises means for decreasing changes in the magnetic flux with respect to currents flowing through said coils in the write mode.

15. An apparatus according to claim 13, wherein said flux generating means has a magnetic core in which said coil is provided, and said inductance control means has means for saturating said magnetic core in the write mode.

16. An apparatus according to claim 13, wherein said flux generating means has a magnetic core in which said coil is provided, and said inductance control means comprises means for flowing a saturation direct current through said coil wound on said magnetic core in the read mode.

17. An apparatus according to claim 13, wherein said flux generating means has a magnetic core in which said coil is provided, and said inductance control means comprises means for flowing a current of an electromagnet, which is applied to a magneto-optical recording medium in write and read modes, through said coil wound on said magnetic core as a saturation direct current.

* * * * *